US011012692B2

(12) United States Patent
Fracastoro et al.

(10) Patent No.: US 11,012,692 B2
(45) Date of Patent: May 18, 2021

(54) APPARATUSES AND METHODS FOR ENCODING AND DECODING IMAGES

(71) Applicant: SISVEL TECHNOLOGY S.R.L., None (IT)

(72) Inventors: Giulia Fracastoro, Turin (IT); Enrico Magli, Turin (IT)

(73) Assignee: SISVEL TECHNOLOGY S.R.L., None (IT)

( * ) Notice: Subject to any disclaimer, the term of this patent is extended or adjusted under 35 U.S.C. 154(b) by 0 days.

(21) Appl. No.: 15/768,450

(22) PCT Filed: Oct. 13, 2016

(86) PCT No.: PCT/IB2016/056138
§ 371 (c)(1),
(2) Date: Apr. 13, 2018

(87) PCT Pub. No.: WO2017/064645
PCT Pub. Date: Apr. 20, 2017

(65) Prior Publication Data
US 2018/0338143 A1      Nov. 22, 2018

(30) Foreign Application Priority Data

Oct. 16, 2015   (IT) ...................... 102015000062727

(51) Int. Cl.
*H04N 19/12*       (2014.01)
*H04N 19/625*     (2014.01)
*H04N 19/176*     (2014.01)
*H04N 19/147*     (2014.01)
*H04N 19/122*     (2014.01)
*H04N 19/139*     (2014.01)
(Continued)

(52) U.S. Cl.
CPC ........... *H04N 19/12* (2014.11); *H04N 19/122* (2014.11); *H04N 19/139* (2014.11); *H04N 19/147* (2014.11); *H04N 19/176* (2014.11); *H04N 19/18* (2014.11); *H04N 19/196* (2014.11); *H04N 19/625* (2014.11); *H04N 19/61* (2014.11)

(58) Field of Classification Search
None
See application file for complete search history.

(56) References Cited

U.S. PATENT DOCUMENTS

2011/0135212 A1   6/2011   Alshina et al.
2012/0008675 A1   1/2012   Karczewicz

OTHER PUBLICATIONS

International Search Report and Written Opinion dated Dec. 7, 2016, issued in PCT Application No. PCT/IB2016/056138, filed Oct. 13, 2016.

(Continued)

*Primary Examiner* — Kate H Luo
(74) *Attorney, Agent, or Firm* — Workman Nydegger

(57) ABSTRACT

A method and an apparatus are provided for encoding and/or decoding digital images or video streams. The encoding apparatus includes a processor configured for reading at least a portion of an image (f), determining a rotation angle ($\theta$) on the basis of the portion of the image (f), determining rotated transform matrix (V') which is the result of a rotation of at least one basis vector of a Discrete Cosine Transform matrix (V) by the rotation angle ($\theta$), computing transformed coefficients (f˜) on the basis of the pixel values contained in the portion of the image (f) and the rotated transform information (V'), outputting the transformed coefficients (f˜) to the destination.

21 Claims, 24 Drawing Sheets

(51) Int. Cl.
*H04N 19/18* (2014.01)
*H04N 19/196* (2014.01)
*H04N 19/61* (2014.01)

(56) References Cited

OTHER PUBLICATIONS

Du Liu et al., *Graph-Based Rotation of the DCT Basis for Motion-Adaptive Transforms*, 2013 IEEE International Conference on Image Processing, Sep. 15, 2013, pp. 1802-1805, XP032965983.
Ivan W. Selesnick et al., *A Diagonally-Oriented DCT-Like 2D Block Transform*, Wavelets and Sparsity XIV, vol. 8138, No. 1, Sep. 8, 2011, pp. 14, XP060021248.
Rui F. C. Guerreiro et al., *Maximizing Compression Efficiency Through Block Rotation*, Institute for Systems and Robotics, Instituto Superior Recnico, Nov. 16, 2014, pp. 4, XP05528416.

(a)

(b)

(a)

(b)

(c)

(a)

(b)

(c)

(a)

(b)

(a)

| 1 | 1 | 1 | 1 | 1 | 1 | 1 | 100 |
|---|---|---|---|---|---|---|---|
| 1 | 1 | 1 | 1 | 1 | 1 | 100 | 100 |
| 1 | 1 | 1 | 1 | 1 | 100 | 100 | 100 |
| 1 | 1 | 1 | 1 | 100 | 100 | 100 | 100 |
| 1 | 1 | 1 | 100 | 100 | 100 | 100 | 100 |
| 1 | 1 | 100 | 100 | 100 | 100 | 100 | 100 |
| 1 | 100 | 100 | 100 | 100 | 100 | 100 | 100 |
| 100 | 100 | 100 | 100 | 100 | 100 | 100 | 100 |

(b)

(a)

| 354,50 | -225,49 | 0,00 | -23,57 | 0,00 | -7,03 | 0,00 | -1,77 |
|---|---|---|---|---|---|---|---|
| -225,49 | 49,50 | 103,46 | 0,00 | 18,58 | 0,00 | 5,70 | 0,00 |
| 0,00 | 103,46 | -49,50 | -58,60 | 0,00 | -11,66 | 0,00 | -2,74 |
| -23,57 | 0,00 | -58,60 | 49,50 | 38,02 | 0,00 | 7,23 | 0,00 |
| 0,00 | 18,58 | 0,00 | 38,02 | -49,50 | -25,41 | 0,00 | -3,70 |
| -7,03 | 0,00 | -11,66 | 0,00 | -25,41 | 49,50 | 16,22 | 0,00 |
| 0,00 | 5,70 | 0,00 | 7,23 | 0,00 | 16,22 | -49,50 | -8,52 |
| -1,77 | 0,00 | -2,74 | 0,00 | -3,70 | 0,00 | -8,52 | 49,50 |

(b)

(a)

| 354,50 | 0,00 | 0,00 | 0,00 | 0,00 | 0,00 | 0,00 | 0,00 |
|---|---|---|---|---|---|---|---|
| -318,90 | 49,50 | 0,00 | 0,00 | 0,00 | 0,00 | 0,00 | 0,00 |
| 0,00 | 146,31 | -49,50 | 0,00 | 0,00 | 0,00 | 0,00 | 0,00 |
| -33,34 | 0,00 | -82,88 | 49,50 | 0,00 | 0,00 | 0,00 | 0,00 |
| 0,00 | 26,27 | 0,00 | 53,78 | -49,50 | 0,00 | 0,00 | 0,00 |
| -9,94 | 0,00 | -16,49 | 0,00 | -35,93 | 49,50 | 0,00 | 0,00 |
| 0,00 | 8,05 | 0,00 | 10,22 | 0,00 | 22,94 | -49,50 | 0,00 |
| -2,51 | 0,00 | -3,87 | 0,00 | -5,23 | 0,00 | -12,05 | 49,50 |

(b)

(a)

(b)

APPARATUSES AND METHODS FOR ENCODING AND DECODING IMAGES

BACKGROUND OF THE INVENTION

Field of the Invention

The present invention relates to a method and an apparatus for encoding and/or decoding digital images or video streams; particularly, an apparatus and method for compressing and decompressing digital images or video streams by means of the so-called Steerable Discrete Cosine Transform (SDCT) is described.

Problem Addressed by the Invention

The 2D Discrete Cosine Transform (DCT) is the most common transform used for block-based image and video compression; being at the basis of popular video coding standards such as MPEG-2 (used, for example, for terrestrial and satellite standard definition video broadcasting and in the DVD storage format), H.264/AVC (used for high-definition video broadcasting, streaming over IP networks and in Blu-Ray discs) and in the recently standardized H.265/HEVC (expected to replace H.264/AVC in the above-mentioned scenarios). Any DCT transform comprises one so called DC (Direct Current) component or basis function which contains the constant valued basis function and AC (Alternate Current) components, which contain the high frequencies spectral components of the image, i.e., the details.

In a typical coding framework, the image is subdivided into pixel (or sample) blocks having a square shape and then the DCT is applied to each block (possibly adapting the size of the block to the image characteristics), which is then independently encoded and decoded in the simplest case (more advanced compression schemes may include intra and inter-frame block prediction to further improve the codec performance).

Particularly, the DCT separates the image into parts (or spectral sub-bands) of differing importance with respect to the image visual quality.

Each 2D Discrete Cosine Transform acting on a square block or matrix of N×N input samples of a bidimensional signal (e.g., pixels of an image) uses a set of real basis vectors whose components are cosines. Each DCT basis contains the eigenvectors of a symmetric "second difference" matrix (see for example G. Strang SIAM review, vol. 41, no. 1, pp. 135-147, 1999).

Clearly, the actual ability of the DCT to compact the energy of a signal depends on the semantics of the particular image or image block to be encoded. The values resulting from the transform are generally called coefficients, or transformed coefficients.

The 2D DCT is composed of two separable 1D (one-dimensional) transforms along the vertical and horizontal directions, thus applied to each row and column of the considered block. For this reason, images dominated by horizontal and vertical patterns are desirable and can be efficiently represented by this conventional DCT.

However, digital images, especially natural images, often present arbitrarily shaped discontinuities; in those cases, the 2D Discrete Cosine Transform becomes inefficient because the significant coefficients are not constrained to an area of the matrix of transformed coefficients and this leads to higher bitrate or reconstruction artifacts at the decoding side. FIG. 18-a visually describes the aforementioned statements: around the edges of the represented sloping roof reconstruction artifacts become evident.

Description of Prior Art

Several solutions have been proposed during the past years to modify the implementation of the separable 2D DCT in order to incorporate directional information into the transform. A Directional DCT (DDCT) is the first attempt in this sense in which the first 1D DCT may choose to follow a direction other than the vertical or horizontal one, then the coefficients produced by all directional transforms in the first step are rearranged so that the second transform can be applied to the coefficients that are best aligned with each other (see B. Zeng and J. Fu, "Directional discrete cosine transforms—a new framework for image coding," Circuits and Systems for Video Technology, IEEE Transactions on, vol. 18, no. 3, pp. 305-313, 2008). However, this method faces several issues: 1D DCTs of various lengths are needed, some of them are very short and their lengths are not always a power of two. Moreover, the second DCT may not always be applied to coefficients of similar AC frequencies.

In the specific field of Intra-frame video coding a Mode-Dependent Directional Transform (MDDT), derived from Karhunen-Loeve transform (KLT) using prediction residuals from training video data, has been proposed (see Y. Ye and M. Karczewicz, "Improved H.264 intra coding based on bidirectional intra prediction, directional transform, and adaptive coefficient scanning," in Image Processing (ICIP), 2008 15th IEEE International Conference on, 2008, pp. 2116-2119). Several variations and enhancement of MDDT have been suggested which exploit symmetry to reduce the number of transform matrices needed (see M. Budagavi and M. Zhou, "Orthogonal MDDT and mode dependent DCT," ITU-T Q, vol. 6, 2010; H. Yang, J. Zhou, and H. Yu, "Simplified MDDT (SMDDT) for intra prediction residual," Doc. JCTVC-B039, MPEG-H/JCT-VC, 2010; A. Tanizawa, J. Yamaguchi, T. Shiodera, T. Chujoh, and T. Yamakage, "Improvement of intra coding by bidirectional intra prediction and 1 dimensional directional unified transform," Doc. JCTVC-B042, MPEGH/JCT-VC, 2010). The main drawback of these methods lies on the fact that training sets need to be processed in order to obtain the optimal transforms for a given coding mode.

Recently, a graph-based approach has been investigated also in the image processing field and techniques for filtering and transformations have been developed (e.g., the graph Fourier transform) in order to overcome the limitations of the traditional coding process.

According to this idea each image can be represented as a combination of nodes and edges, where each pixel is a node and the edges describe the connectivity region among the pixels (see D. Shuman, S. Narang, P. Frossard, A. Ortega, and P. Vandergheynst, "The emerging field of signal processing on graphs: Extending highdimensional data analysis to networks and other irregular domains," Signal Processing Magazine, IEEE, vol. 30, no. 3, pp. 83-98, 2013). This graph representation allows one to design a discontinuity-aware transform in an elegant and effective way.

Block-based methods using graph transform for depth map coding have been proposed by A. Ortega et al. in "Edge-adaptive transforms for efficient depth map coding" (Picture Coding Symposium (PCS), 2010. IEEE, 2010, pp. 2808-2811) and "Graph based transforms for depth video coding" (Acoustics, Speech and Signal Processing (ICASSP), 2012 IEEE International Conference on. IEEE, 2012, pp. 813-816). Although results seem to be encouraging in the depth-map coding field, they all claim unsatisfactory results on natural images that are not piece-wise smooth. In addition, one of the main drawbacks of graph-based compression techniques lies in the cost required to represent and encode the graph, which may outweigh the coding efficiency provided by these new transforms.

SUMMARY OF THE INVENTION

Block-based separable transforms tend to be inefficient when blocks contain arbitrarily shaped discontinuities. In the recent years, transforms incorporating directional information have been explored as an appealing alternative.

The present invention aims at solving this problem by providing a method and an apparatus for encoding and/or decoding digital images or video streams, based on a new directional transform, the so called Steerable Discrete Cosine Transform (SDCT). Founding its definition in the graph-transform theory of a grid graph, the SDCT is obtained modifying the orientation of the 2D DCT basis. According to the semantic of the image to be encoded, SDCT enables precise matching of directionality in each image block, in order to optimize the coding performance of the entire encoding and decoding system.

The proposed coding chain provides a significant performance gain when compared to the conventional DCT. Moreover, the mathematical framework on which the steerable DCT is based allows to generalize the transform to more complex steering patterns than a single pure rotation.

DETAILED DESCRIPTION OF THE INVENTION

In this description, any reference to "an embodiment" will indicate that a particular configuration, structure or feature described concerning the implementation of the invention is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for simplicity's sake, and do not limit the protection scope or extension of the various embodiments.

For simplicity's sake, if not differently stated, the description below refers to a grayscale image, however all the embodiments could be applied also to the color components of the images or videos through some processing well known in literature, e.g., downsampling of the color components, change of color spaces, etc.

Figure 1:
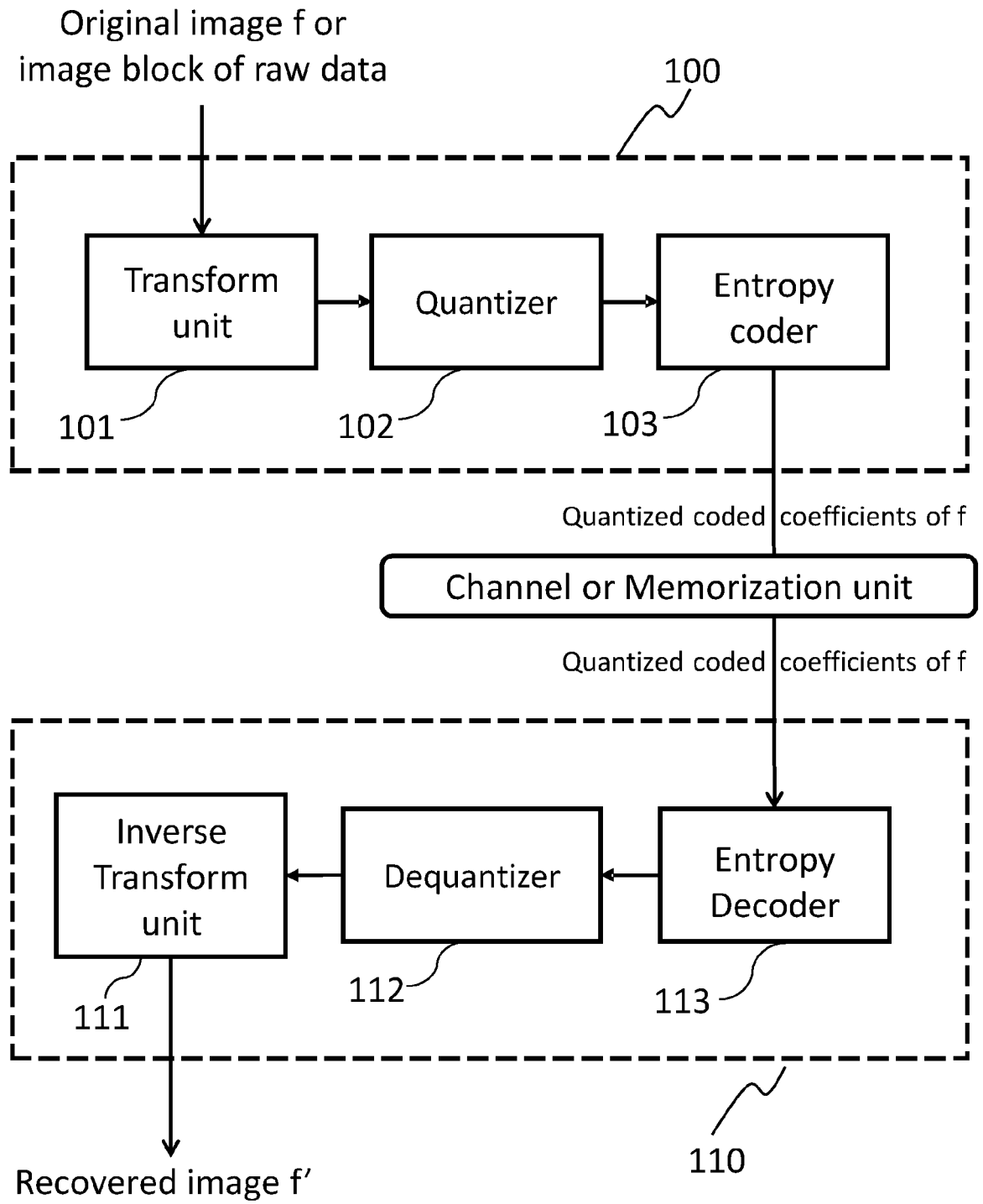
FIG. 1 shows a block diagram of a reference image encoding-decoding system according to the state of art.

FIG. 1 shows a typical encoding/decoding process for digital images. It should be noted that many other operations may be performed into the encoder 100 and the decoder 110, however the present description aims at depicting only the main units of an image coding apparatus in an exemplificative manner.

With reference to FIG. 1, an encoding apparatus 100 for compressing digital images based on hybrid video coding basically comprises a transform unit 101, a quantizer 102 and an entropy coder (or encoder) 103.

The transform unit 101 takes as input the image or block image to be coded and converts it to a frequency domain using a specific transform. The unit transform is commonly represented by the Discrete Cosine Transform in common image standards like JPEG. The Discrete Cosine Transform (DCT) represents an image as a sum of sinusoids of varying magnitudes and frequencies. It aims at representing the original sample of a signal, an image for example, in a more efficient way by concentrating the visually significant information in just a few coefficients such that the transformed parameters require fewer bits to be coded.

2-D DCT (or 2D-DCT, or simply DCT) can be computed in two steps by successive 1-D operations on rows and columns of an image, using the separability principle. It operates on an image f, a block of N×N samples, typically image samples (or residual values after prediction in the space and/or time domain). The output of a 2-dimensional DCT is a set of N×N coefficients representing the image block data in the DCT domain which can be considered as "weights" of a set of standard basis patterns (i.e., weights applied to each basis pattern), often referred to as basis functions of the DCT.

Figure 2:
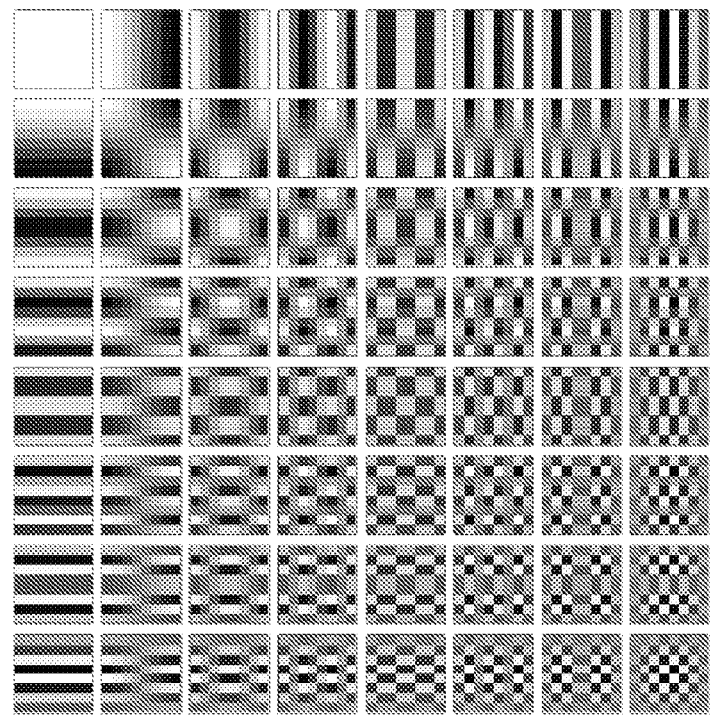
FIG. 2 depicts a two-dimensional DCT basis functions for a sample block N×N, with N=8 in a) and N=4 in b).
Figure 2:
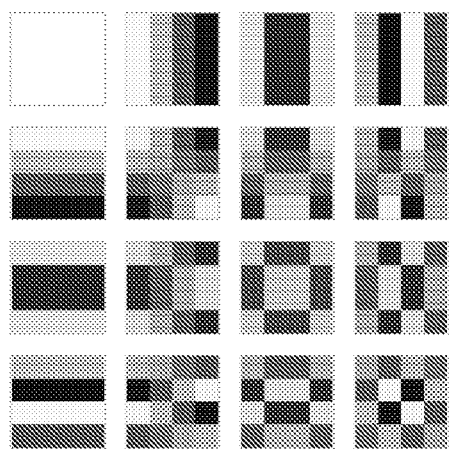

FIG. 2 shows the basis patterns for a Y block with N=8 and 64 basis functions (FIG. 2-*a*) and N=4 with 16 basis functions (FIG. 2-*b*). Horizontal frequencies increase from left to right, and vertical frequencies increase from top to bottom. The constant-valued basis function at the upper left is often called the DC basis function, and the corresponding DCT coefficient is often called in literature the DC coefficient. The other basis functions exhibit a progressive increase in frequency both in the vertical and horizontal direction.

The present invention replaces this phase with the new Steerable Discrete Cosine Transform as described later on in FIG. 8.

The transformed coefficients have some features that enable efficient compression in the following stages.

The quantizer 102 reduces the input range values into a smaller set. In the main image coding scheme the quantizer unit exploits the low sensitiveness of the HVS (Human Visual System) towards high frequencies. Thus, the amount of information in the high frequency components is reduced in this phase, sometimes rounded to zero, depending on their position with regard to the quantization matrix.

This step could be lossy or lossless regarding the selected type of quantization.

After the data has been quantized into a finite set of values, the quantized coefficients are passed to unit 103 before being sent to the channel or memorization unit.

The entropy coding unit 103 rearranges the samples in an efficient way (e.g., a zig-zag scan reading) reduces the number of bit needed to code a symbol. Typical entropy coding techniques are, for example, Huffman coding or arithmetic coding like CABAC or CAVLC.

Similarly, with also reference in FIG. 1, an image decoding apparatus 110 based on hybrid video decoding mainly comprises the following units: an entropy decoder 113, a dequantizer 112 and an inverse transform unit 111.

The entropy decoder 113 converts the input bit stream comprising the encoded and quantized image coefficients into the quantized coefficients.

The dequantizer 112 performs the inverse process of unit quantizer 102 by reconstructing the values of the coefficients to be passed to the final main stage.

The inverse transform unit 111 takes as input the dequantized coefficients and reconstructs back the output of the image signal (the so called samples or pixel values) into the spatial domain.

The inverse transform unit is commonly represented by the inverse of the DCT, the Inverse Discrete Cosine Transform (IDCT or type-III DCT).

Since the DCT is proved not to be the optimal transform for an image or video coding/decoding device, the present invention discloses an apparatus based on a new directional transform, the Steerable Discrete Cosine Transform or SDCT, described in details in the following. The SDCT improves the conventional DCT by keeping into account the directional information of each image block, thus adapting the encoding to the specific semantic of the current samples block.

Figure 8:
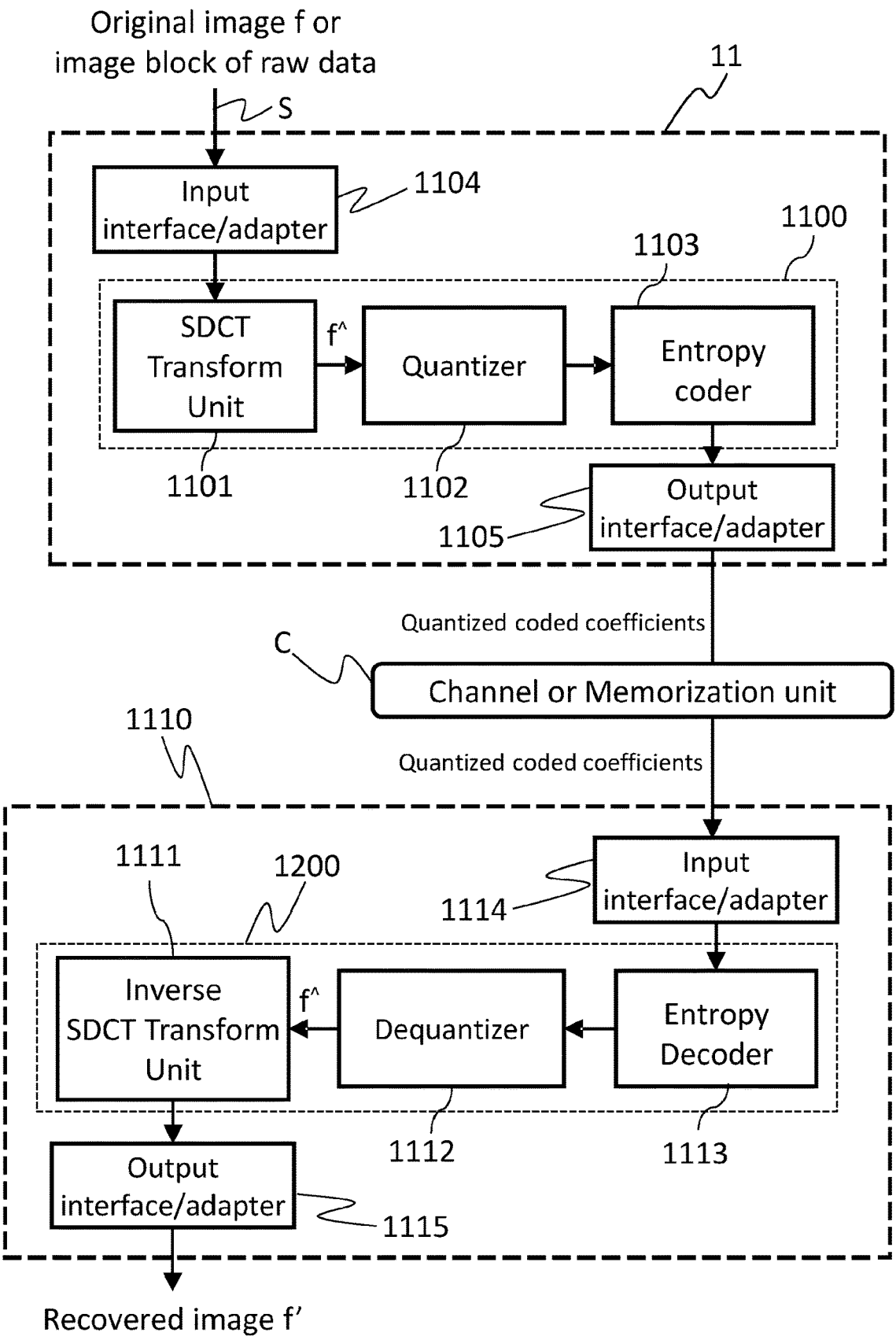
FIG. 8 shows a block diagram of a reference image encoding and decoding apparatus according to the new Steerable Cosine Transform.

FIG. 8 illustrates an exemplary reference image encoder and decoder pair based on the Steerable Discrete Cosine Transform, wherein said encoder is fed with an image f or an image block containing raw data in any format (for example RGB, YUV, and so on).

The encoder device 11 comprises the following parts:

input means 1104 (e.g., an adapter for Ethernet, USB, Firewire or SATA interface standards and/or a modem for GPRS/UMTS/LTE communication standards or the like) configured for acquiring at least a portion of an image f from a source S (e.g., a camera, a video stream stored in a storage media or the like);

output means 1105 (e.g., an adapter for Ethernet, USB, Firewire or SATA interface standards and/or a modem for GPRS/UMTS/LTE communication standards or the like) configured for outputting at least a portion of an encoded image to a destination, e.g., a decoder capable of decoding SDCT video stream, a storage media or the like;

processing means 1100 (e.g., one or more CPU, GPU, DSP, CPLD, FPGA, or the like) configured for reading at least a portion of said image f having preferably a square shape, encoding said portion of the image f according to SDCT transform by preferably executing a set of instructions implementing the SDCT transform process, and outputting, by means of the output means 1105, transformed coefficients f^ to said destination 1110, wherein said transformed coefficients f^ represents the image f in an encoded SDCT format.

The processing means 1100 can also be described in structural way, i.e., they can comprise a transform unit 1101, here represented by the new SDCT transform unit, a quantizer 1102 and an entropy coder 1103. This means that the physical realization of (virtual) elements 1101-1103 can be made either by using a single physical processor executing a set of instruction that implements the functions of at least one of said elements 1101-1103 or by using distinct dedicated hardware components implementing the functions of at least one of said elements 1101-1103 or a combination of both the just mentioned solutions.

To better understand what the present invention discloses, a detailed description of the transform unit 1101 is now provided.

As previously stated, the Discrete Cosine Transform cannot represent in an effective way discontinuities of the image not following a certain horizontal or vertical direction. This problem can be solved by applying to the conventional image or video coding some elements pertaining to the graph theory.

A graph-based transform can be seen as a generalization of the previously described block-based transform (or, conversely, the block based transform can be considered a special case of a graph-based transform). The image (or any subset thereof) can be represented as a graph G of nodes or vertices V connected by edges E: each node or vertex represents a pixel of the image and each edge between two nodes describes the adjacency between the pixels: an edge connecting two pixels indicates that they are adjacent horizontally or vertically.

It is known from the graph theory (see for reference R. Merris, "Laplacian matrices of graphs: a survey," Linear algebra and its applications, vol. 197, pp. 143-176, 1994) that, given two graphs G1 and G2, the first graph G1 represented by a set of vertices V1 and a set of edges E1 and the second graph G2 represented by a set of vertices V2 and a set of edges E2, the product of G1 and G2 is a new graph G=G1×G2 whose vertex set V is the Cartesian product V=V1×V2.

It is also known from the graph theory (see for reference R. Merris, "Laplacian matrices of graphs: a survey," Linear algebra and its applications, vol. 197, pp. 143-176, 1994. and "Laplacian graph eigenvectors," Linear algebra and its applications, vol. 278, no. 1, pp. 221-236, 1998) that, given a first graph G1 with n1 number of vertices and a second graph G2 with n2 number of vertices, for the graph-Laplacian L of the product graph G=G1×G2, the multiset of eigenvalues of L(G) are all possible sums of $\lambda i(G1)+\lambda j(G2)$, where each element $\lambda i(G1)$ is the i-th eigenvalue of the first graph G1 and $0 \le i < n1-1$ and each element $\lambda j(G2)$ is the j-th eigenvalue of the second graph $0 \le j < n2-1$.

Moreover, if vi is the eigenvector of G1 affording $\lambda i(G1)$ and vj is the eigenvector of G2 affording $\lambda j(G2)$, then the Kronecker product (denoted by $\otimes$) vi$\otimes$vj is an eigenvector of G1×G2 affording $\lambda i(G1)+\lambda j(G2)$.

A path graph Pn (see FIG. 3-a) is a particular simple graph with two or more vertices with degree one or two (i.e., a path graph is not branched and it contains two terminal vertices with degree 1 and, depending on the dimension of the graph, all others with degree 2). It is known from "The discrete cosine transform" (G. Strang, SIAM review, vol. 41, no. 1, pp. 135-147, 1999), that the eigenvectors of the Laplacian matrix L(G)=D(G)-A(G) of the graph path Pn of n vertices are exactly the 1D-DCT Type II basis vectors.

$$v_j^{(k)} = \cos\left(\frac{\pi k}{n}\left(j + \frac{1}{2}\right)\right) \quad \lambda_k = 4\sin^2\left(\frac{\pi k}{2n}\right) \quad (1)$$

for values k=0, ..., n-1, where $v^{(k)}=(v_0^{(k)}, v_1^{(k)}, ..., v_{n-1}^{(k)})$ is the eigenvector of L corresponding to $\lambda_k$. Given that the multiplicity of the eigenvalues in the second formula is always 1, the 1D DCT basis is the unique eigenbasis for the Laplacian of a graph path $P_n$, i.e., the graph transform for a signal (an image, for example) represented by a path graph is equivalent to the 1D-DCT transform.

Figure 3:
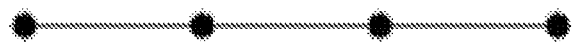
FIG. 3 shows a path graph (a), a grid graph (b) and a square graph (c).
Figure 3:
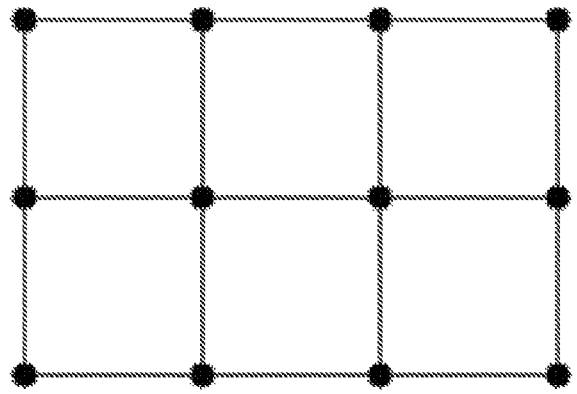
Figure 3:
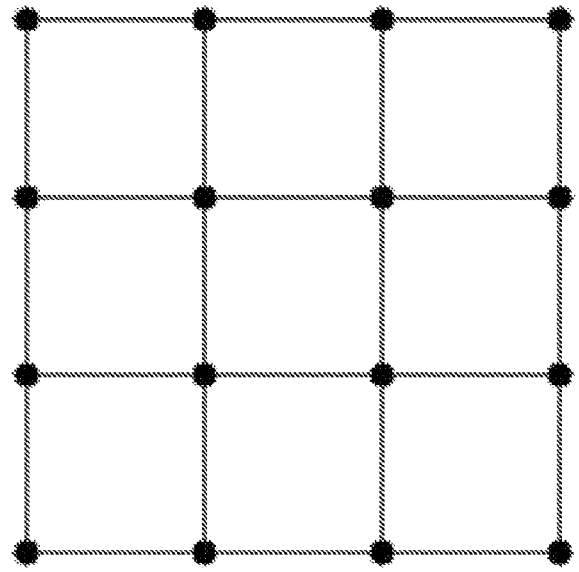

A two-dimensional grid graph $G_{mn}$ can be seen as the Cartesian product of two path graphs $P_n$ and $P_m$ on n and m vertices, respectively (see FIG. 3-b). When m=n, i.e., the two graphs have the same number of vertices, the product of the two graphs $P_n$ is a square grid graph (see FIG. 3-c).

As also stated in "Analyzing the optimality of predictive transform coding using graph-based models," (C. Zhang and D. Florencio, Signal Processing Letters, IEEE, vol. 20, no. 1, pp. 106-109, 2013), it can be said that the basis vectors of the 2D DCT form an eigenbasis of the Laplacian matrix of a square grid graph.

Starting from these considerations it is straightforward to mathematically compute the eigenvalues $\lambda_{k,l}$ and the corresponding eigenvectors $v^{(k,l)}$ of the Laplacian L of the square grid graph generated as product of the two path graphs $P_K$ and $P_l$ on n elements as $$\lambda_{k,l} = \lambda_k + \lambda_l = 4\sin^2\left(\frac{\pi k}{2n}\right) + 4\sin^2\left(\frac{\pi l}{2n}\right) \quad (2)$$

for $0 \le k, l \le n-1$, where $v^{(k)}$ is the eigenvector of the path graph corresponding to $\lambda_k$, and $v^{(l)}$ is the eigenvector of the path graph corresponding to $\lambda_l$. Then an eigenvector $v^{(k,l)}$ corresponding to $\lambda_{k,l}$ is the Kronecker product $v^{(k)} \otimes v^{(l)}$.

Given the above formula, it is evident that some repeated eigenvalues are present and the following considerations are straightforward:

$\lambda_{k,l}=\lambda_{l,k}$ for each k≠l;

the multiplicity of $\lambda=4$ is n-1;

n-1 eigenvalues with multiplicity 1 are present (i.e., $\lambda_{k,k}$ for k≠n/2, supposing n an even integer greater than 0);

all other elements have multiplicity 2, except $\lambda_{k,n-k}$ for $1 \le k \le n-1$.

Moreover, the dimension of the eigenspaces for the pair of eigenvalues $\lambda_{k,l}$ and $\lambda_{l,k}$ is bigger than 1. This means that the 2D DCT is not the unique eigenbasis for the Laplacian of a square grid graph.

Figure 4:
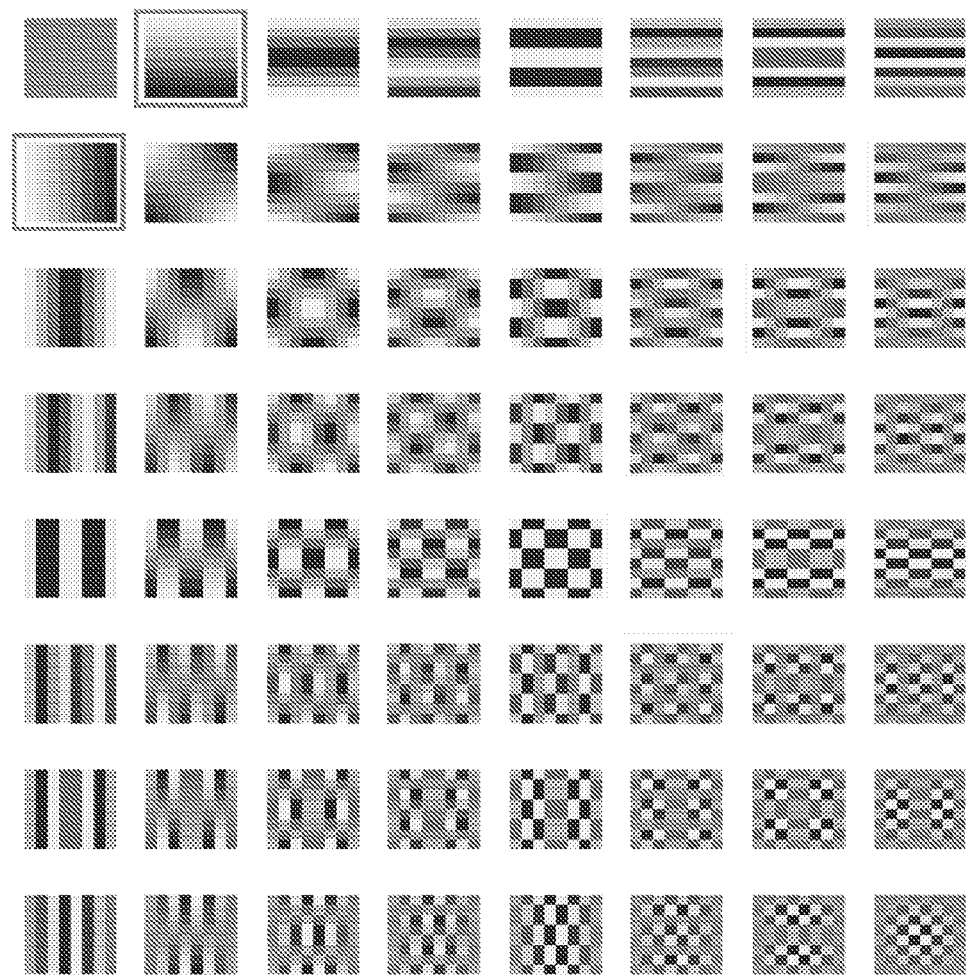
FIG. 4 shows 2D DCT basis vectors as in FIG. 2(a) where the corresponding two eigenvectors of an eigenvalue of multiplicity 2 are highlighted.
Figure 5:
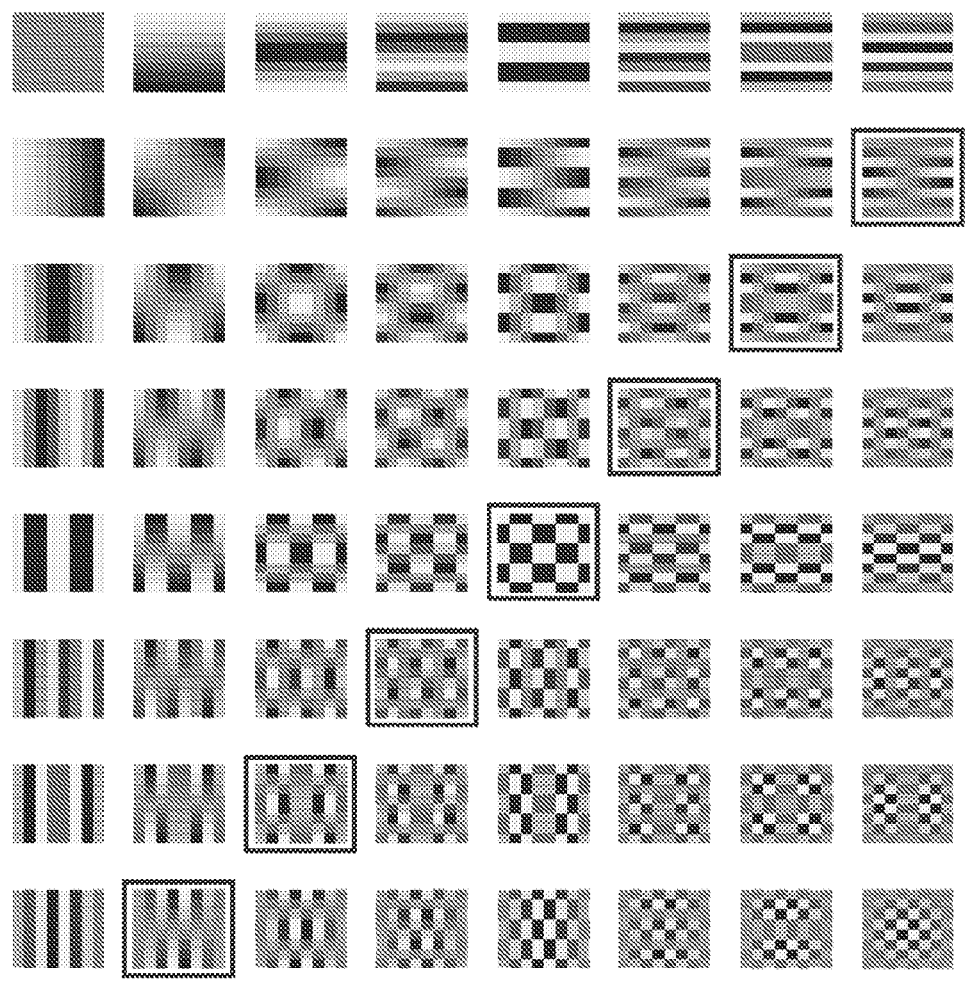
FIG. 5 shows 2D DCT basis vectors as in FIG. 2(a) where the N−1 eigenvectors, i.e., 7 in the present example for N=8, corresponding to $\lambda=4$ are highlighted.
Figure 6:
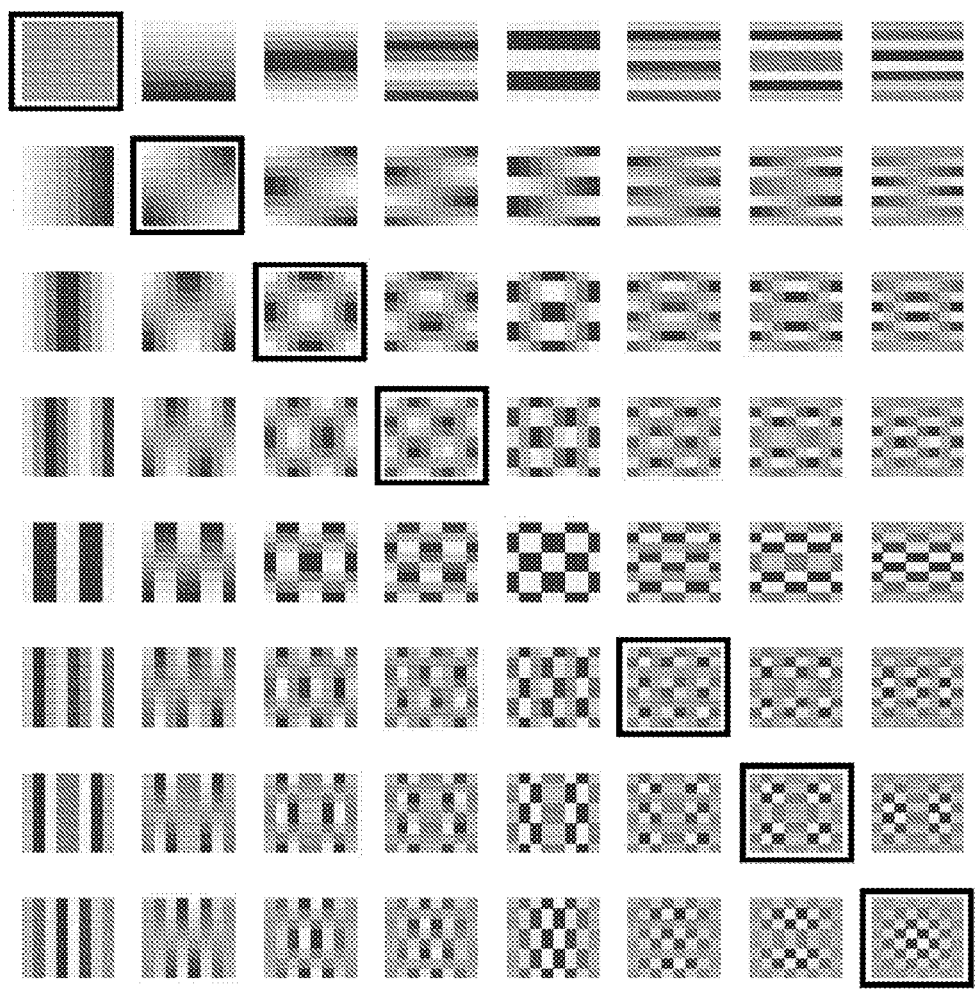
FIG. 6 shows 2D DCT basis vectors as in FIG. 2(a) where in FIG. 6 the N−1 eigenvectors corresponding to the eigenvalues with multiplicity 1 are highlighted.

FIGS. 4, 5 and 6 depict the aforementioned concepts, in highlighting some of the same 2D DCT basis eigenvectors represented in matrix form, assuming n=8; the top left element (matricial coordinates 0,0) is eigenvector $v^{(0,0)}$, the bottom right element (matricial coordinates 7,7) is eigenvector $v^{(7,7)}$. In particular, in FIG. 4 the two eigenvectors corresponding to an eigenvalue of multiplicity 2 are highlighted by a surrounding rectangle: clearly the eigenvectors with coordinates (1,0) and (0,1) have the same "shape" apart from a 90 degrees ($\pi/2$ radians) rotation. In FIG. 5 the n-1 eigenvectors, i.e., 7 in the present example being n=8, corresponding to $\lambda=4$ are highlighted in the same manner; in FIG. 6 the n-1 eigenvectors corresponding to the eigenvalues with multiplicity 1 are marked by a surrounding rectangle.

Accordingly, the present invention discloses an apparatus and method for encoding and decoding images or video streams starting from a new transform whose definition lies on the previous theoretical considerations. Generally speaking, the invention proposes to use in the image or video coding process a new kind of DCT transform obtained by rotating at least one basis vector of the conventional 2D DCT matrix by at least one rotation angle (θ) determined according to certain criteria. Conversely in the decoding process the inverse domain transform is performed by inverse transforming the image coefficients by using the same, new kind of DCT transform obtained from the conventional 2D DCT in the same way, i.e., effecting the same rotating operation performed at the encoding side.

The transform unit 1101 takes as input an image or image block. For simplicity's sake, let the input be an image block f of 8×8 pixels, i.e., N=8 and also n=8. The method for computing the coding steps performed by unit 1101 are described in FIG. 9.

Since it has been proved that the 2D DCT is not the unique eigenbasis for the Laplacian of a square grid graph, it is possible to find other possible eigenbases of the said Laplacian.

In principle we can rotate each or any eigenspace of a given 2D DCT matrix with a different angle, obtaining each time a new 2D DCT transform, that we call SDCT ("Steerable Discrete Cosine Transform"). This can be done by rotating all basis vectors of an eigenspace of the Laplacian of the square grid graph associated to the 8×8 block as explained above. It should be noted that the square grid graph depends only on geometrical properties of the image pixels (adjacencies and block dimensions), not on the particular pixel values themselves.

Among these new eigenbases and all the possible resulting transform matrices, the system may use the one that better represents the properties of the specific image or image block to be compressed, i.e., the system will select the basis function that better describes the current samples with, for examples, discontinuities that would have a not performing representation in terms of artifacts and coding efficiency with the conventional 2D-DCT.

Consequently, all possible eigenvalues $\lambda$ and eigenvectors v are computed. Given an eigenvalue $\lambda_{k,l}$ of the Laplacian L whose corresponding eigenspace has dimension two and the two vectors $v^{(k,l)}$ and $v^{(l,k)}$ of the 2D DCT n×n transform matrix (denoted in its entirety as V from now on), $v^{(k,l)}$ and $v^{(l,k)}$ are the eigenvectors of L corresponding to $\lambda_{k,l}$. Any other possible basis of the eigenspace corresponding to $\lambda_{k,l}$ can be defined as the result of a rotation of the eigenvectors $v^{(k,l)}$ and $v^{(l,k)}$ according to the following formula:

$$\begin{bmatrix} v^{(k,l)\prime} \\ v^{(l,k)\prime} \end{bmatrix} = \begin{bmatrix} \cos\theta_{k,l} & \sin\theta_{k,l} \\ -\sin\theta_{k,l} & \cos\theta_{k,l} \end{bmatrix} \begin{bmatrix} v^{(k,l)} \\ v^{(l,k)} \end{bmatrix}$$

for $\theta_{k,l}$ varying in the range from 0 to $\pi/2$ radians; in this way the new eigenvector vectors v' are obtained from basis vectors v by a rotation of the angle $\theta$. Consequently a new transform matrix V' can be defined, which comprises the so obtained vectors v' in lieu of the basis vectors v. In the following of this description, the 2D-DCT transform matrix V is also called "Discrete Cosine Transform information", whereas the new transform matrix V' is also referenced by the term "transform information".

Figure 9:
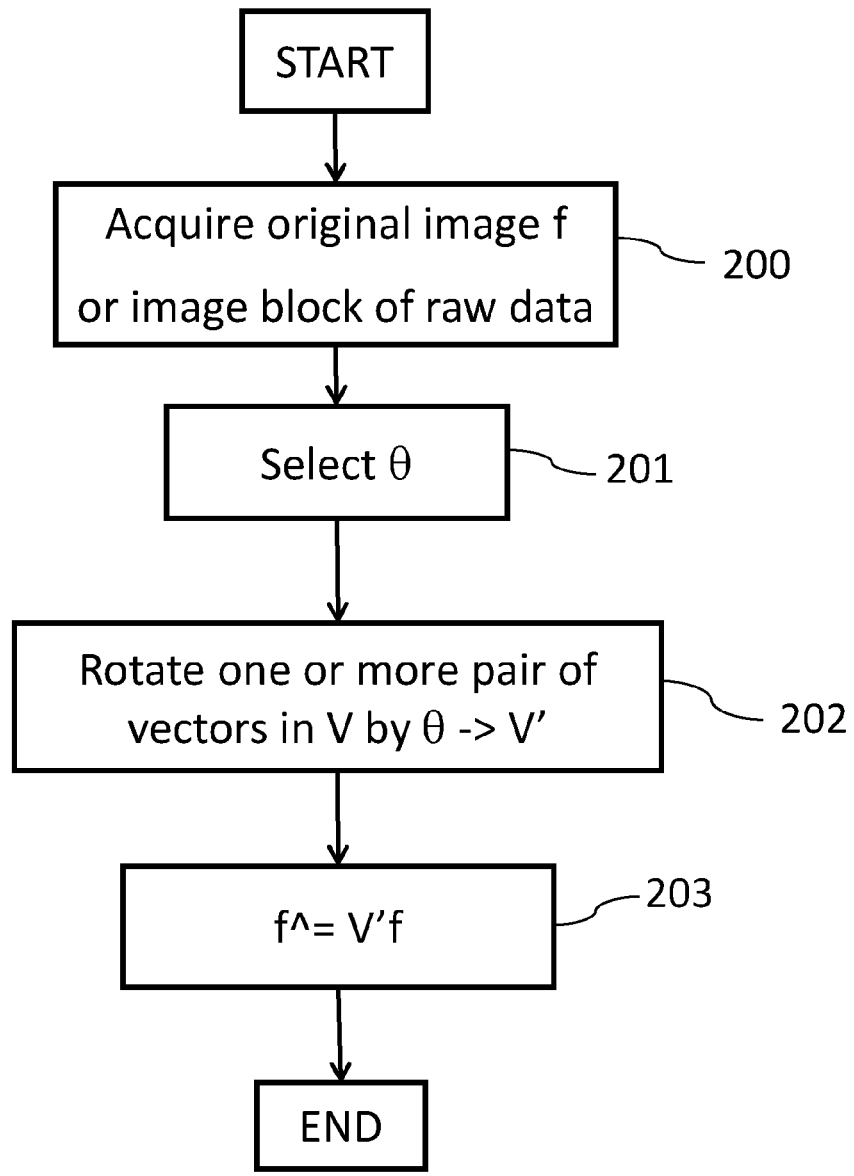
FIG. 9 depicts a block diagram of the coding steps associated with Steerable Cosine Transform SDCT according to the present invention.

Given the above assumptions, a possible embodiment of the SDCT calculation is shown in FIG. 9; first the SDCT transform unit 1101 acquires the original image f or an image block of raw data (step 200); then, at step 201 said unit 1101 selects the optimal angle $\theta$ for the current image block. One possible method for choosing said rotation angle is provided, in an exemplary way, here below and visually described in FIG. 10.

To choose the best rotation angle, let R be, for example, a finite number of angles between 0 and $\pi/2$ radians to be tested and V the original 2D-DCT basis matrix. This R angles can be, for example, uniformly spaced between 0 and $\pi/2$: in mathematical formula $\theta_i = i*\pi/(2(R-1))$ radians, with $0 \le i \le R-1$ J represents an objective function that measures or estimates the coding efficiency associated with the current block; in this case, let J be metric representing (a measure of) the sparsity of the transformed coefficients and $J_{opt}$ the optimal value of said objective function.

Then the proposed exhaustive method consist in iteratively trying all the R angles of the set; said method comprises the following steps:

for each angle $\theta_i$ with $0 \le i \le R-1$, each pair of vectors in V is rotated by the current angle $\theta_i$ (step 303);

a new transform matrix V' is computed with the rotated vectors of the original 2D-DCT V (step 304);

the objective function $J(\theta_i)$ is computed for the current V' (step 305);

the value $J(\theta_i)$ is then compared with the optimal value $J_{opt}$ (step 306): if $J(\theta_i) > J_{opt}$, then $J(\theta_i)$ becomes the new $J_{opt}$ (step 307) and $\theta_i$ is retained as the optimum current angle;

the angle index i is increased after step 306 or 307 and the rotation of step 303 is carried out on the new current angle $\theta_i$.

Figure 10:
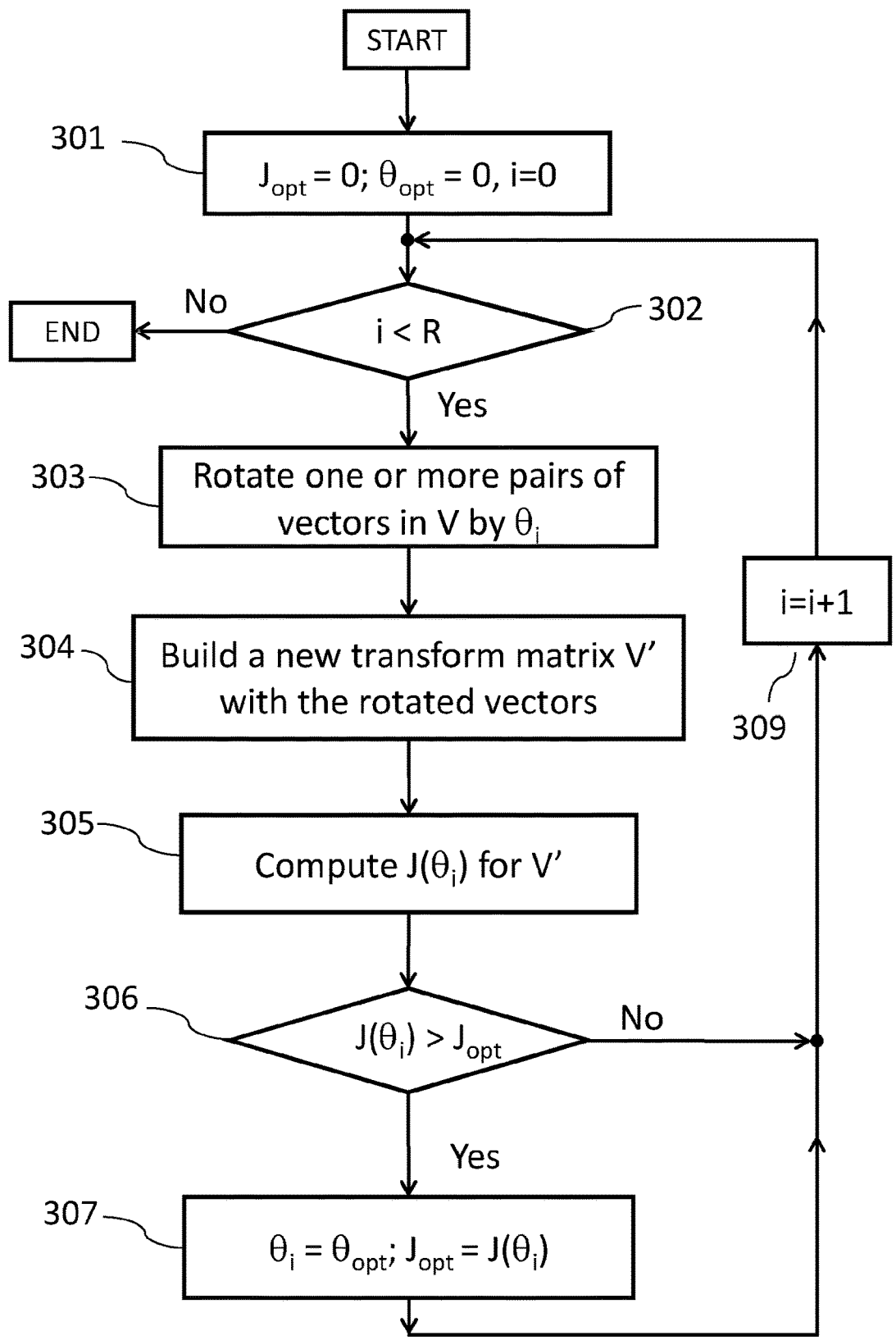
FIG. 10 depicts a block diagram which shows, in an exemplary manner, one of the possible method to find the optimal angle $\theta$ given a set of N angles between 0 and 90 sexagesimal degrees.

All the computation steps shown in FIG. 10 are executed for each angle $\theta$. Thus, among a finite set of R possible angles between 0 and $\pi/2$ radians, the considered method finds the one (i.e., $\theta_{opt}$) that optimizes the objective function J.

Clearly, this is not the only way to compute the optimal rotation angle. Any other suitable methods can be employed for the choice of said angle $\theta$, e.g., a hierarchical search.

Once the optimal angle $\theta$ has been selected, it can be applied to the vectors of the original DCT matrix V at step 202 by generating transform information V'.

The new transform matrix Steerable Discrete Cosine Transform (SDCT), i.e., V' in the above description, can be created as follows. For each eigenbasis with multiplicity greater than 1, the corresponding eigenvectors (or basis vectors) are rotated in pairs. The diagonal elements, which have been proved to have multiplicity 1, remain unchanged. So in some embodiments of the invention the basis vectors or eigenvectors defining eigenbasis with single multiplicity are not rotated, or, equivalently, are rotated by an angle large 0°. Consequently if all other basis vectors of the original DCT matrix are rotated by the same angle, there are multiple sets of basis vectors defining different eigenspaces rotated by the same angle.

In essence, the SDCT transform consists in selecting at least one eigenspace defined by its basis vectors with dimension greater than one and rotating such basis vectors. In such a way, a particular SDCT transform is obtained. The invention proposes to use the SDCT for transforming a bidimensional signal for its compression by adapting the transform to the semantics of the signal.

Notice that, in principle, each eigenspace can be rotated by a different rotation angle, i.e., for each pair of DCT basis the system can select the rotation angle that better represents the current samples block. In other words, the sets of basis vectors defining different eigenspaces are rotated by different angles. In this way, each component of the SDCT is oriented according to the angle that maximize the coding efficiency for that particular block. The result is an improving of the coding performance when compared to the conventional (2D) DCT and a reconstructed image or video with less visible artifacts at the decoder side. More generally, at least two sets of basis vectors defining different eigenspaces are rotated by different angles.

Thus, in one embodiment of the present invention the SDCT is modified such that each DCT original pair is rotated by a different rotation angle according to the coding performance of the image or block image to be represented.

Another embodiment of the present invention represents a special case of the previous embodiment in which each eigenspace presents the same rotation angle, i.e., each pair of the original DCT basis vector is oriented according to the same rotation angle, if the basis vectors are rotated in pairs. More generally, two or more sets of basis vectors defining two or more eigenspaces are rotated by the same angle.

Figure 7:
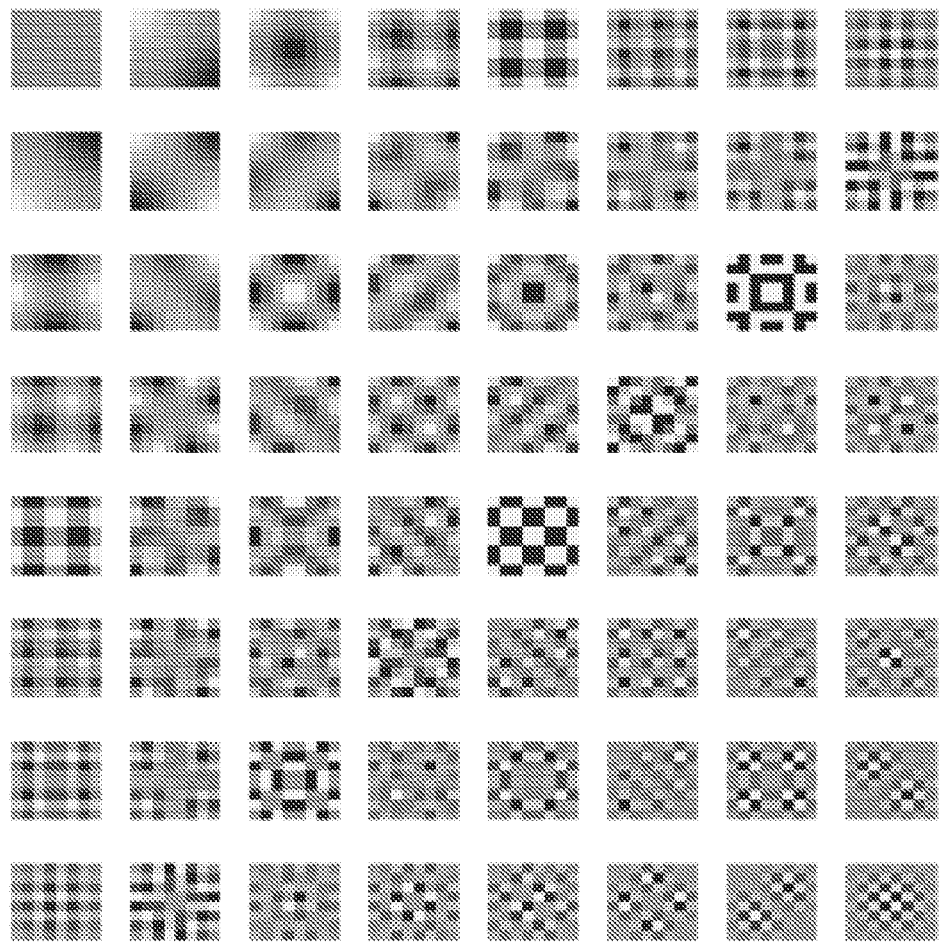
FIG. 7 depicts a Steerable Discrete Cosine Transform (SDCT) in which each component of the conventional DCT has been rotated by 45° (sexagesimal degrees).

Rotating all the eigenspaces by the same angle, SDCT is still equivalent to the graph transform of a square grid graph as described before, but its orientation is different from the original DCT. FIG. 7 describes this special case for a rotation angle of π/4 radians. In details, according to an embodiment of the invention the new transform matrix V' in FIG. 7 is obtained as follows:

1) For each eigenvalue $\lambda_{k,l}$ with multiplicity 2, the corresponding eigenvectors are rotated;
2) the n−1 eigenvectors corresponding to λ=4 are rotated in pairs v(k,n−k) and v(n−k,k);
3) if n is an even number, then the eigenvector v(n/2,n/2) is not rotated;
4) the diagonal elements v(k,k) with multiplicity 1 are not rotated, i.e., those DCT base vectors remain unchanged.

Compared to a conventional coding scheme previously described in FIG. 1, in this case, i.e., for an embodiment in which each eigenspace presents the same rotation angle, the common rotation angle used for obtaining the rotated DCT transform is the only information needed by the decoder in order to recover/decompress the original samples of the image block of a still image or of the video stream, as highlighted in FIG. 8. In video bit-streams, for each macroblock or Coding Unit or image portion, a coding mode is signaled. The coding modes may represent intra or inter prediction modes, partitions for motion-compensated prediction or transform coding. In an embodiment of the invention, the rotation information can be implied in a specific coding mode, known at the encoder and decoded side.

In order to reduce the bit rate necessary for storing and/or transmitting an image hybrid-encoded according to the invention the rotation angle or angles can also be quantized and possibly entropy coded by the encoding apparatus 11 before being outputted according to known techniques; they can also be multiplexed with the hybrid-encoded image data f̂ in any suitable way. In such a case, the decoding apparatus 1110 according to the invention will perform the inverse operation carried out by the encoder in the opposite order: first, the angle value or values are de-multiplexed from the input digital stream, then entropy decoded and finally dequantized before being used for computing the ISDCT on the image coefficients.

Finally at step 203 (see FIG. 9) the SDCT transform unit 1101 computes the SDCT transformed coefficients f̂ applying the new transform matrix SDCT obtained at step 202 to the image samples f, i.e., SDCT transform unit 1101 multiplies the transform matrix V' for the image vector f, preferably by using Fast Fourier Transform algorithm.

The SDCT transformed coefficients are then passed to units 1102 and 1103 to be quantized and entropy coded as described before for FIG. 1 for units 102 and 103.

Particularly, the entropy coder unit 103 can rearrange the image components from low frequency components to high frequency components (e.g., in a "zigzag" order) and retain the most important ones. Clearly, increasing the number of retained coefficient will lead to a better reconstruction of the original image components.

If an entire image (either a still image or one being part of a video stream) has to be processed, the above hybrid encoding procedure is repeated for each image block in which the image has been partitioned.

Summarizing, the encoding apparatus 11 according to the invention executes a method for encoding digital images or video streams, wherein said method comprises the following phases:

a receiving phase, wherein at least a portion of the image f is received by means of the input means 1104;

a rotational phase, wherein at least one rotation angle θ is determined, by means of processing means 1100, for rotating basis vectors of a Discrete Cosine Transform matrix V (also referred as Discrete Cosine Transform information) for transforming said portion of said image f, and wherein a rotated transform matrix V' (also referred as transform information) is the result of a rotation of at least one basis vectors of said Discrete Cosine Transform matrix V by said at least one rotation angle θ;

a transform phase, wherein transformed coefficients f̂ are computed on the basis of the pixels contained in said portion of the image f and said rotated transform matrix V' by transforming the pixel values contained in said portion of the image f from the space domain into the frequency domain by means of said rotated transform matrix V';

an output phase, wherein the transformed coefficients f̂ are transmitted to the destination 1110 by means of the output means 1105.

Similarly, FIG. 8 also describes in an exemplary way an image decoder 1110 according to the invention. The decoder device 1110 comprises the following parts:

input means 1114 (e.g., an adapter for Ethernet, USB, Firewire or SATA interface standards and/or a modem for GPRS/UMTS/LTE communication standards or the like) configured for acquiring at least an encoded portion of an image f from a communication channel or a storage media C; in a particular embodiment of the invention, also at least one rotation angle used for obtaining the rotated DCT matrix or an indicator thereof (not shown in the Figures) is transmitted for the encoded image portion along with such portion;

output video means 1115 (e.g., an adapter for VGA, HDMI, or S-Video displaying standards and/or an adapter for Ethernet, USB, Firewire or SATA interface standards or the like) configured for outputting a reconstructed image f', preferably by displaying it on a LCD panel or the like;

processing means 1200 (e.g., one or more CPU, GPU, DSP, CPLD, FPGA, or the like) configured for receiving, through the input means 1114, at least the transformed coefficients f̂ of the image f, decoding said portion of the image f according to ISDCT transform by processing said transformed coefficients f̂ preferably executing a set of instructions implementing the ISDCT decompression algorithm, and outputting the reconstructed image f' through said output video means 1115.

The processing means 1200 can also be described in structural way, i.e., they can comprise an Inverse SDCT (ISDCT) transform unit 1111, a dequantizer 1112 and an entropy decoder 1113. This means that the physical realization of (virtual) elements 1111-1113 can be made either by using a single physical processor executing a set of instruction that implements the functions of at least one of said elements 1111-1113 or by using distinct dedicated hardware components implementing the functions of at least one of said elements 1111-1113 or a combination of both the just mentioned solutions.

In a first embodiment of the invention, the rotation angles or indicators thereof are transmitted by the encoding apparatus 11 to the decoding apparatus 1110. In such a case, the entropy decoder unit 1113 takes as input the quantized entropy coded coefficients and the angle θ or the angles $θ_i$ of the current image block, depending on the selected embodiment of the invention at the encoding side. Namely, at the decoder side, the system can receive one angle value θ, meaning that each pair of corresponding basis vector needs to be rotated by the same angle θ, or more angle values $θ_i$, being i a number that varies as function of the number of pair basis the encoding apparatus decided to rotate in that image block.

In another embodiment of the invention, the rotation angles (or the rotation angle)—or indicators thereof—are not transmitted and the rotation information is implied in the associated coding mode, as previously described. In such embodiment the encoder apparatus signalizes in the metadata of the bitstream that this coding method is used along with any required information, either explicit or implicit, about the relation between the prediction modes and the rotation angles. The decoding apparatus acquires this signalling from the received bitstream and inverts the transform performed at the encoding side on a certain image portion basing on a rotated DCT transform matrix obtained through the same rotation angle(s).

For simplicity's sake, let θ be only one angle and f̂ be one image block coefficients. For each image block the entropy decoder 1113 and the subsequent dequantizer 1112 recover the f̂ coefficients (in case of ideal channel transmission) and the angle θ from their encoded and quantized form.

Figure 11:
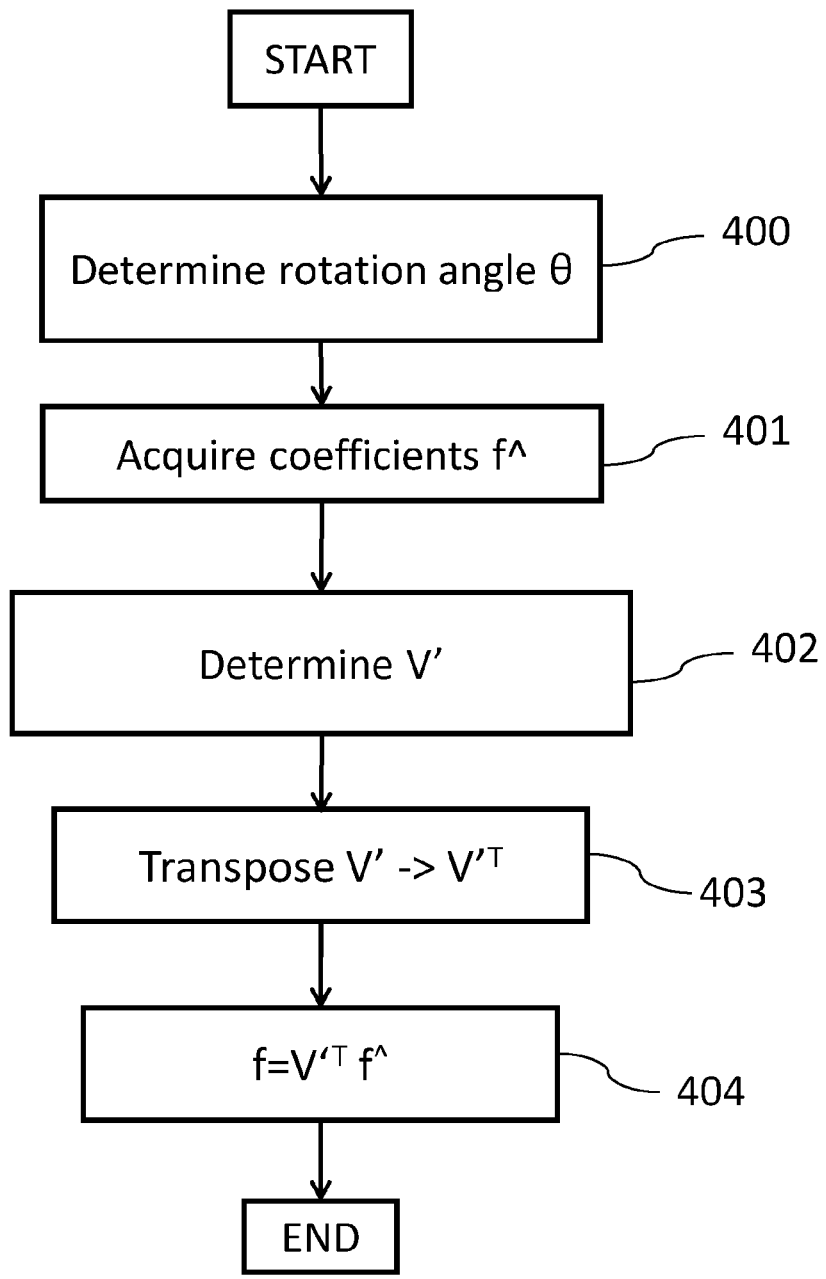
FIG. 11 shows a block diagram of the decoding steps associated with Inverse Steerable Discrete Cosine Transform ISDCT according to the present invention.

Then, the Inverse SDCT transform unit 1111 reconstructs the image block f in the space domain based on the procedure described in FIG. 11. Unit 1111 is here represented by the inverse transformation of the Steerable Cosine Transform described above, the Inverse Steerable Cosine Transform or ISDCT or $SDCT^{-1}$.

Firstly, in this embodiment, the ISDCT unit 1111 determines at step 400 the angle θ and acquires from the dequantizer 1112 the (decoded and dequantized) coefficients f̂ of the image block (step 401). In another possible embodiment of the invention, the rotation angle θ of a block is transmitted by the encoding apparatus 11 along with the coefficients f̂. In such a case, the decoding apparatus acquires from the dequantizer also such angle as received by the input interface 1114, decoded by the entropy decoder 1113, and dequantized by dequantizer 1112. Then each 2D-DCT basis vector pair $v^{(k,l)}$ and $v^{(l,k)}$ is rotated by the angle θ (step 401) according to the formula:

$$\begin{bmatrix} v^{(k,l)\prime} \\ v^{(l,k)\prime} \end{bmatrix} = \begin{bmatrix} \cos θ_{k,l} & \sin θ_{k,l} \\ -\sin θ_{k,l} & \cos θ_{k,l} \end{bmatrix} \begin{bmatrix} v^{(k,l)} \\ v^{(l,k)} \end{bmatrix}$$

recovering the transform matrix SDCT V' (step 402) described in an exemplary way in FIG. 7 for θ=45°.

In step 403 matrix V' is transposed, generating the Inverse transform matrix $V'^T$, i.e., the ISDCT. Then, the original image block f is recovered via the matrix multiplication f=$V'^T$·f̂ (step 404).

Here f is the original block image, however, in a common coding/decoding unit f could be an approximate reconstruction of the original sample due to some lossy coding steps or transmission/reception errors.

Note that each image block (entropy decoded and dequantized) is processed according to the method steps described in FIG. 11. If an entire image (either a still image or one being part of a video stream) has to be processed, the above hybrid decoding procedure is repeated for each image block in which the image has been partitioned.

The aim of using a transform matrix whose vector basis has a different orientation from the horizontal/vertical one is a more compact signal representation obtaining by unbalancing the domain transformed coefficients. For each pair of rotated eigenvectors, the total energy of the corresponding transformed coefficients remains unchanged, but it is possible to sparsify the signal representation in each eigenspace. In the optimal case, the rotation compacts all the energy of the pair in one of the two coefficients.

Summarizing, the decoding apparatus 1110 according to the invention executes a method for decoding digital images or video streams, wherein said method comprises the following phases:

a receiving phase, wherein the transformed coefficients f̂ of an encoded portion of the image f are received through the input means 1114;

a rotational phase, wherein at least one rotation angle θ is determined, by means of processing means 1200, for rotating basis vectors of a Discrete Cosine Transform matrix V in order to inverse transform encoded portion of said image f, and wherein a rotated transform matrix V' is determined by means of the processing means 1200, wherein said rotated transform matrix V' is the result of a rotation of at least one basis vector of said Discrete Cosine Transform matrix V by said at least one rotation angle θ;

an inverse transform phase, wherein a reconstructed image f' is computed on the basis of the transformed coefficients f̂ and said rotated transform matrix V' by inverse transforming said transformed coefficients f̂ from the frequency domain into the space domain by means of said rotated transform matrix V';

an output phase, wherein the reconstructed image f' is outputted through output video means 1115.

Performance Tests

Since the target functions addressing the quantization steps (performed by units 1112 and 112, respectively in FIGS. 8 and 1) and the entropy coding phases (in units 1113 and 113) do not change in the configurations to be compared, the M term non-linear approximation has been carried out just in order to evaluate the performance of the proposed SDCT transform in a simple way with respect to the conventional 2D-DCT in a less computationally intensive way.

Since few coefficients obtained by the DCT and SDCT transforms are significant, a practical approximation is to cut to zero small components.

Given the above assumption, it is possible to represent the reconstructed image $I_{rec}$ at the decoder side as a linear sum of its M largest transformed coefficient $c_i$ and the corresponding basis functions $v_i$ as given in the following formula:

$$I_{rec} = \sum_{i=1}^{M} c_i v_i$$

where M ideally is the number of non-zero transformed coefficient to the receiver for the image reconstruction. It follows that a small number of coefficients leads to a better compression performance.

M is chosen in order to maximize the energy J in the M largest coefficients:

$$J = \sum_{i=1}^{M} c_i^2$$

Experiments have been carried out with several test images, to evaluate the impact of the number of quantization angles used to construct the SDCT transform and the influence of the dimension of the block on the coding efficiency (i.e., the SDCT has been applied to 4×4, 8×8, 16×16 pixel block size).

Figure 13:
FIG. 13 represents one of the test images employed for the test experiments.

For simplicity's sake, here only a subset of the tests (performed with the test image in FIG. 13) are reported. PSNR (Peak Signal to Noise Ratio) is taken here as measure of the quality of the signal.

Figure 14:
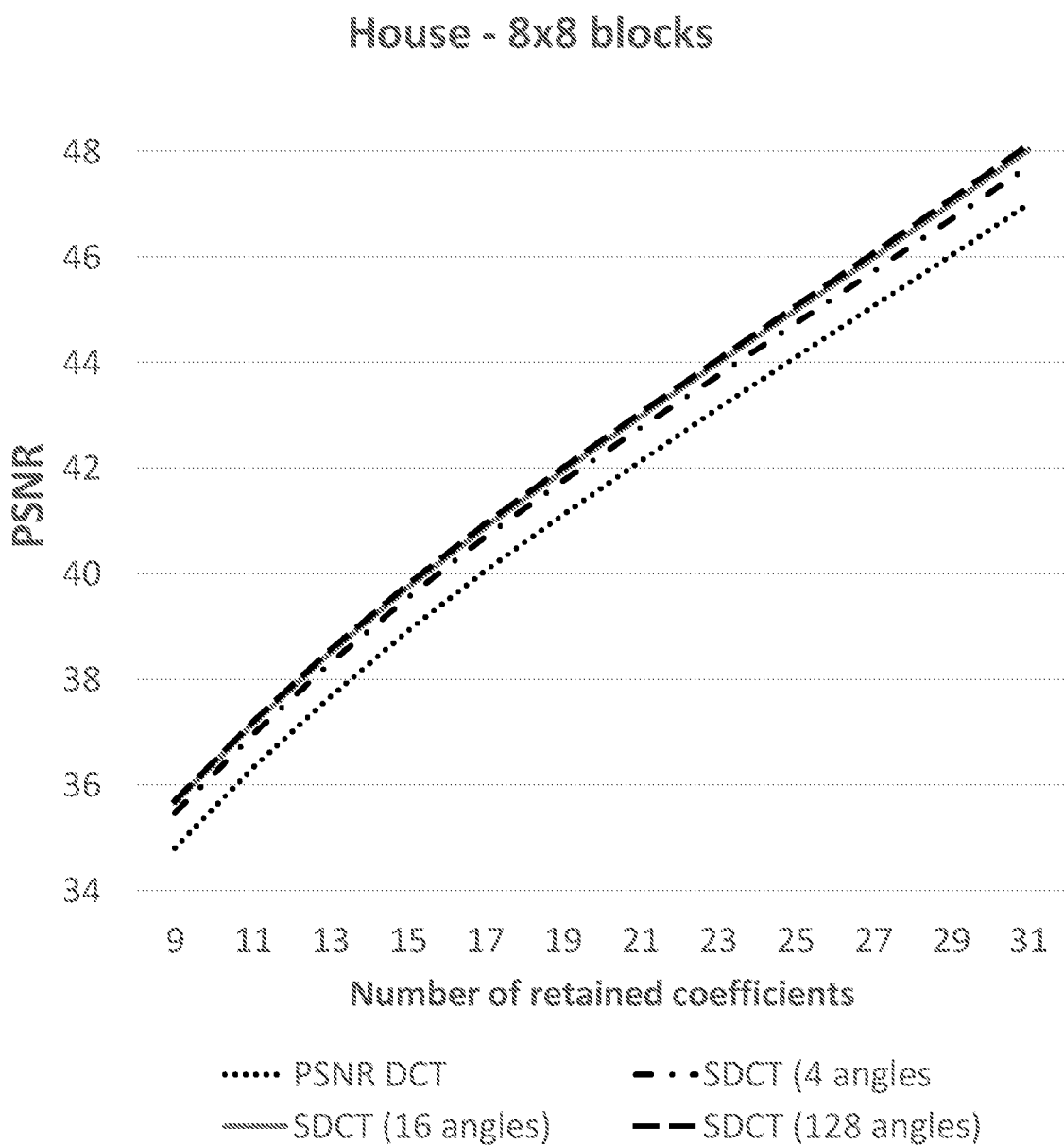
FIG. 14 shows a comparison test between DCT and SDCT with different angle quantizations (4, 16, 128) as function of PSNR and the number of retained coefficient.

With reference to FIG. 14, the results of performance tests of the SDCT as a function of the number of available coefficients for 8×8 blocks, have been evaluated. In details, FIG. 14 shows the SDCT performance for 4, 16 and 128 angles as a function of the transmitted coefficients (i.e., M in the above formula) against the conventional 2D-DCT.

Clearly, increasing the number of angles improves the performance of the SDCT. Improvements become negligible for a number of available angles greater than 16. Tests presented below have been carried out with a 16-angle quantization.

Figure 15:
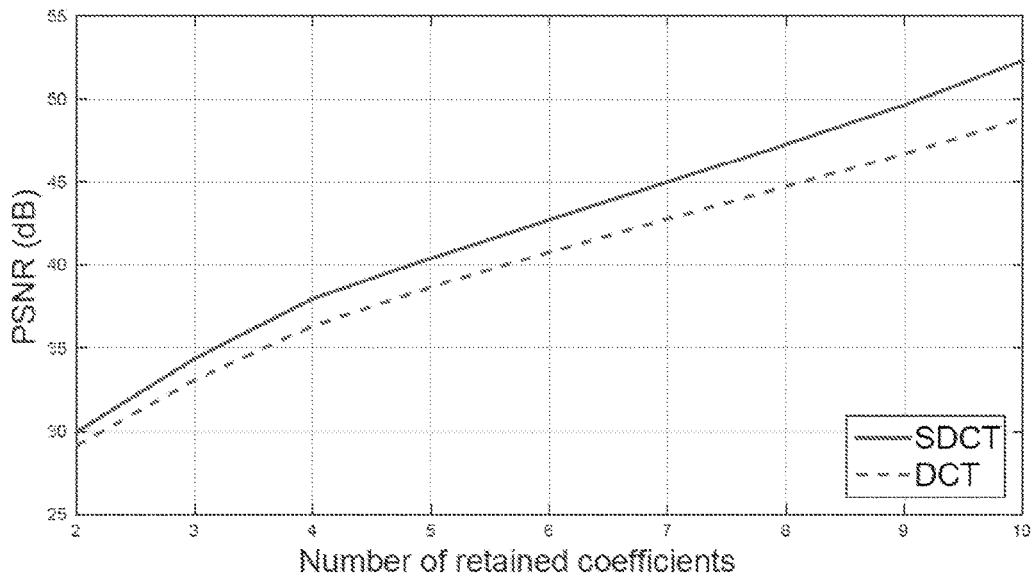
FIG. 15 shows a comparison test, as function of the retained coefficients and PSNR, between DCT and SDCT varying the block size at the basis of the coding/decoding process: a) 4×4 block size, b) 8×8 block size, and c) 16×16 block size.
Figure 15:
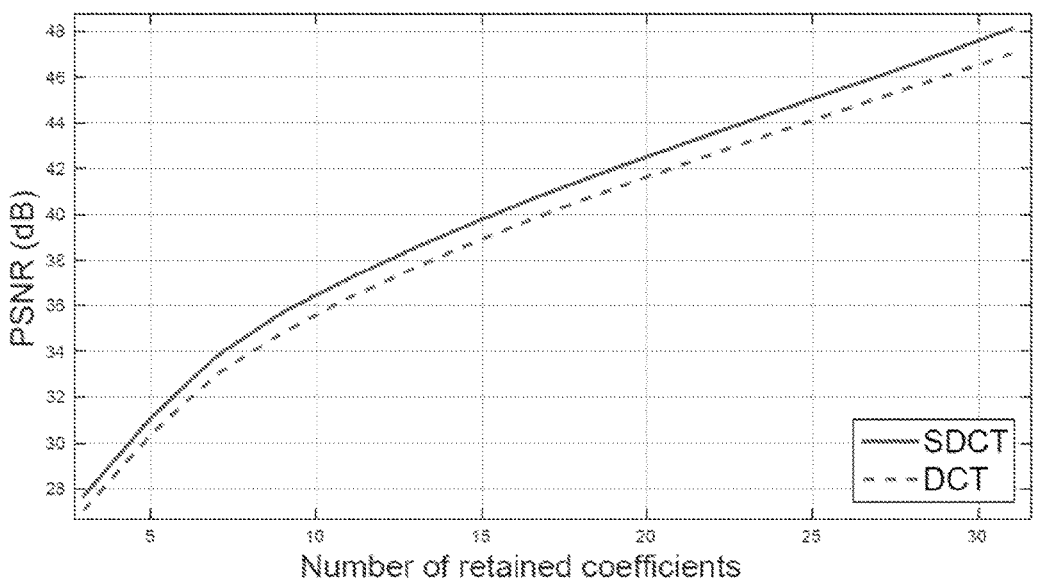
Figure 15:
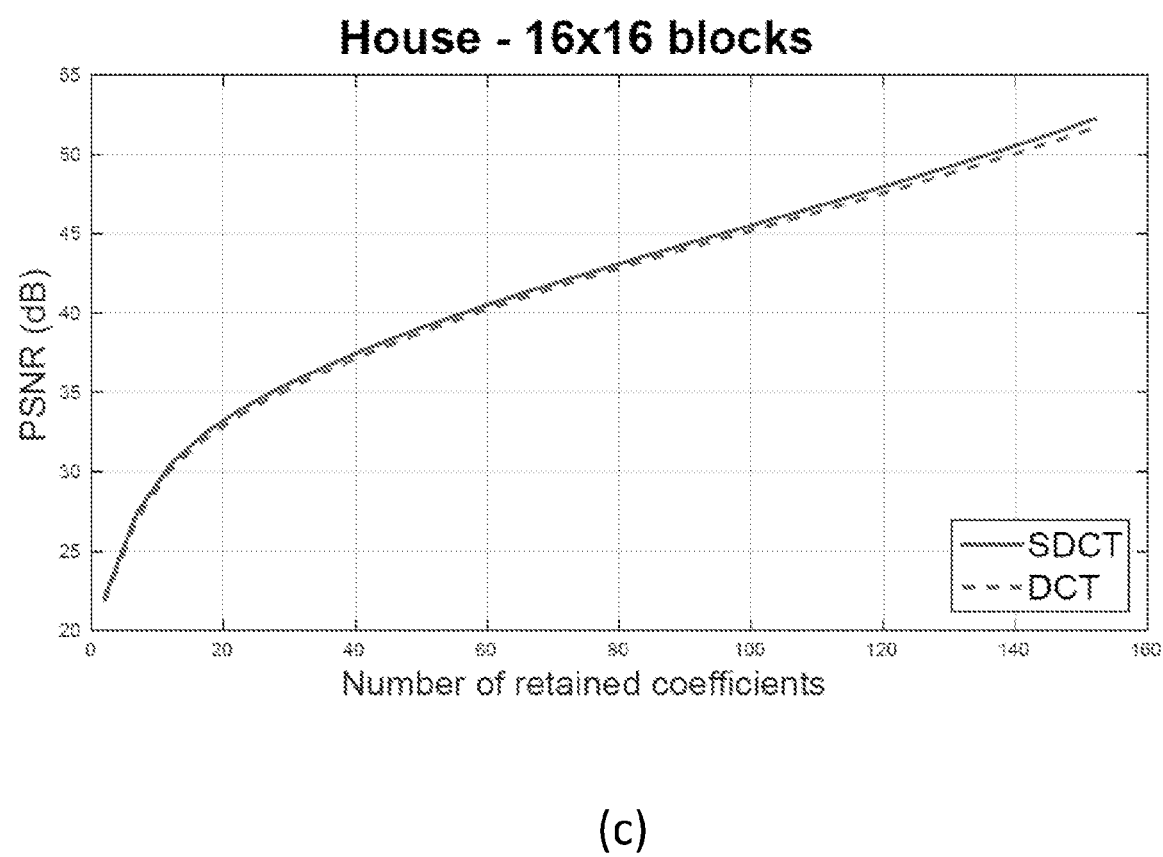

In order to investigate the effect of the block size on the coding efficiency, the test image has been subdivided in different sized blocks; FIG. 15 illustrates a comparison between DCT and SDCT for a 4×4 block size division (FIG. 15-a), 8×8 block size division (FIG. 15-b), 16×16 block size division (FIG. 15-c). When using a single rotation angle, the effectiveness of the SDCT increases for smaller image blocks, because it is very likely that in smaller areas a single predominant direction is present in their discontinuities.

Figure 18:
FIG. 18 shows a detail of the test image in FIG. 13 reconstructed with both DCT (a) and SDCT (b) using 8×8 blocks.
Figure 18:

A detail of the significant improvement obtained by the Steerable DCT is exemplified in FIG. 18 representing the reconstructed image House with six number of retained coefficients (i.e., M=6) and 8×8 block size. SDCT (FIG. 18-b) provides much better visual quality against DCT (FIG. 18-a), minimizing artifacts along the edges thanks to the alignment of the transform to the edge direction given by the new rotated coefficients.

Figure 20:
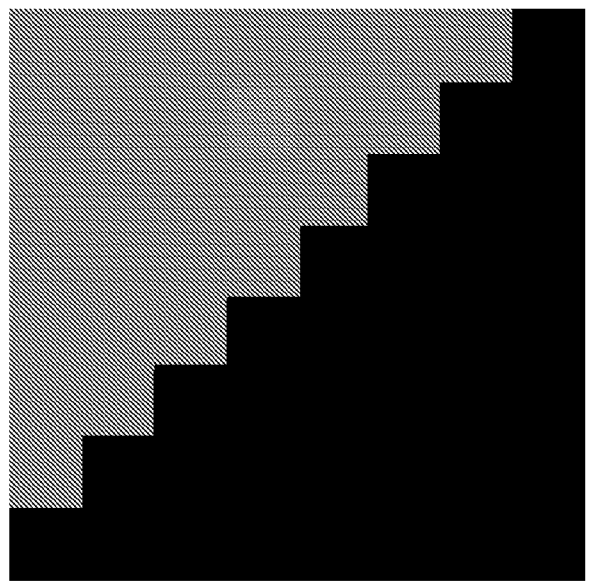
FIG. 20 depicts a toy image (a) and its corresponding pixel values (b).
Figure 21:
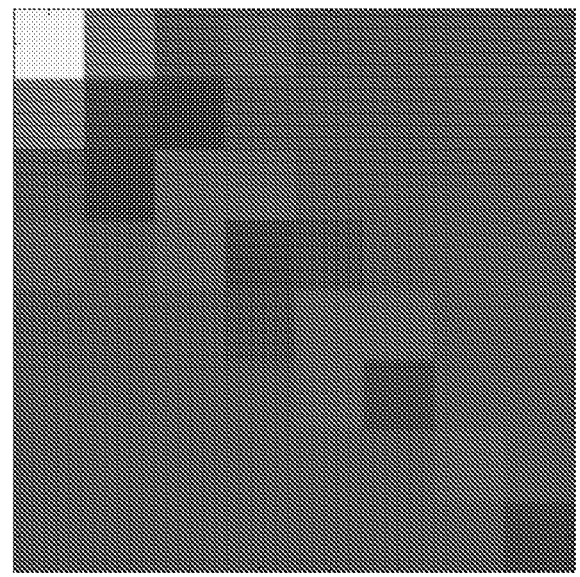
FIG. 21 shows DCT transformed coefficients of the toy image in FIG. 20 both in graphic form (a) and numerical values (b). Different numerical values have been represented with different grey levels.
Figure 22:
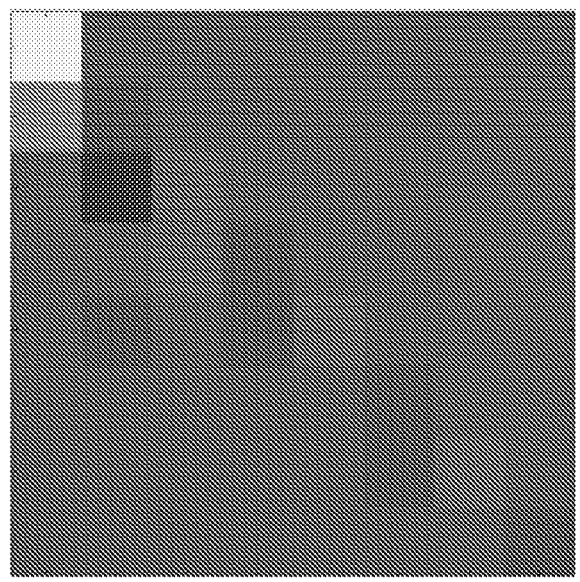
FIG. 22 shows SDCT transformed coefficients of the toy image in FIG. 20 both in graphic form (a) and numerical values (b). Different numerical values have been represented with different grey levels.

Taking into consideration toy image in FIG. 20-a (with the corresponding pixel values in FIG. 20-b), FIGS. 21 (a) and (b) show the DCT transformed coefficients and Figures FIGS. 22 (a) and (b) the SDCT transformed coefficients. As can be seen in FIG. 22-a, the SDCT concentrates the energy in a few coefficients in a very efficient way (i.e., in the ideal case of our toy image, half of the transformed matrix consists of non-zero coefficients). The corresponding reconstructed image at the decoder side in FIG. 23-a perfectly follows the diagonal discontinuity crossing the toy image in FIG. 20.

Figure 23:
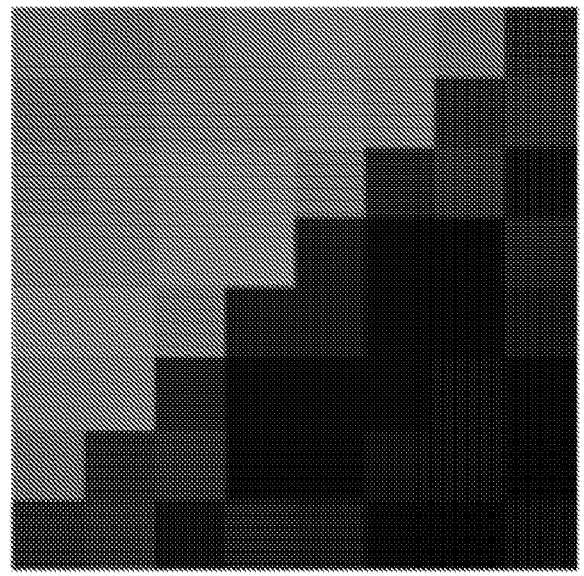
FIG. 23 depicts the reconstructed images of the corresponding toy image in FIG. 20 respectively for the SDCT (a) and DCT (b) transforms.
Figure 23:
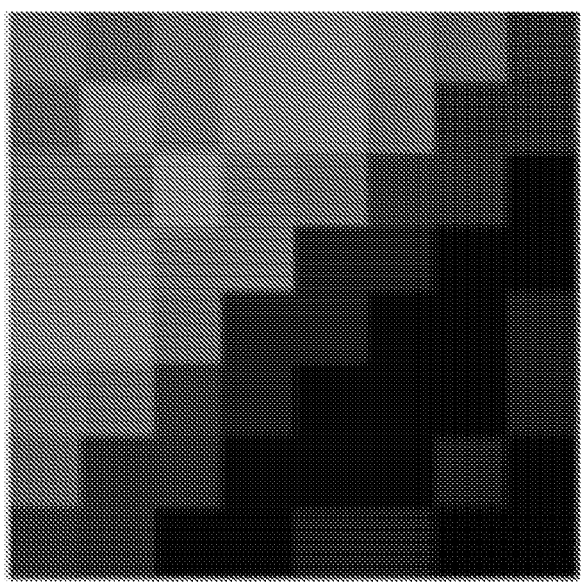

On the contrary, the conventional 2D-DCT (FIGS. 21 (a) and (b)) generated the reconstructed image in FIG. 23-b; clearly it presents visible noise in the flat areas of the image.

Other Embodiments and Generalizations

The preferred embodiment of the present invention relates to grayscale images, however another embodiment involves coding and decoding means for color images in which the chroma components have been processed.

The present description relates on a block-based SDCT, however it can be applied to square blocks of any dimension, FIG. 15 shows in an exemplary way some experiments with blocks of 16×16, 8×8, 4×4 pixels.

For simplicity's sake, in the embodiments of the invention illustrated in the present description the dimension of the SDCT and ISDCT blocks is the same for the whole image. Anyway it is also possible to use an SDCT coding and decoding process in which the block dimension is adapted to the video data semantics in a manner similar to that applicable in some current video standards to the traditional 2D-DCT. This allows to further increase the coding efficiency by avoiding unnecessary transmission of optimal angles for image regions which contain the same kind of oriented discontinuities.

In another embodiment, in the SDCT each eigenbasis of the original 2D-DCT can be rotated by a different rotation angle, i.e., for each pair of DCT basis the system can select the rotation angle that better represents the current sample. In this way, the SDCT is oriented according to the angle or angles that maximize the coding efficiency for that particular block.

In another embodiment of the present invention, one or more angles θ are transmitted with the identification of the eigenspace to be rotated; the identification metric can be an index in a look-up table containing all possible eigenspaces or the identification metric could be implicit (e.g., the decoder can derive the eigenspace corresponding to θ from the receiving order of the angles). In another embodiment, the metric of choosing the optimal angle θ is not an exhaustive search but any other search method, i.e., a hierarchical search performed by consecutive enhancement of the optimal angle θ.

In another embodiment, the objective function J in FIG. 10 could follow a different approach to measure the coding efficiency, for example, a rate-distortion optimization metric, which calculates the minimum transmission bitrate R for a given distortion D, can be applied, e.g., minimizing a Lagrangian cost function J=D+☐R where ☐ here is the so-called Lagrange multiplier.

In another embodiment, the objective function J could follow a different approach to measure the coding efficiency, for example, a psycho-visual optimization metric can be applied, such as the SSIM (Structural SIMilarity) optimization.

In another embodiment, the objective function J, could be a psycho-visual optimization metric depending on the Region of Interest (ROI) of the current image, i.e., if the current block pertains to the Region of Interest of the current image, the encoding apparatus could apply psycho-visual optimization only on this part and use any other method on the other parts of the image (or intra frame).

In another embodiment of the present invention, the SDCT is an integer transform; it is known that the implementation of a DCT-like transform with low error needs a long word length arithmetic with a floating-point implementation; this implies a complex hardware implementation. Recent encoders and decoders solved this problem by specifying the DCT with integer arithmetic. Integer transform avoids encoder-decoder mismatch and drift caused by slightly different floating-point representations.

In another embodiment, the encoding and decoding apparatuses may perform the choice of the optimal angle in a different way. The encoding apparatus in FIG. 8 may comprise memory means (e.g., a Read Only Memory and/or a Random Access Memory and/or Solid State Memory and/or an Hard Disk or the like) containing at least a set of pre-built Steerable Discrete Cosine Transforms; each SDCT having basis rotated by a pre-determined number of angles. In such a case, the choice of the optimal angle can be replaced with the choice of the optimal SDCT among the available ones. The information about the chosen SDCT transform (e.g., the indicator of the selected matrix or the associated coding mode included in the bitstream syntax) is conveyed to the decoder apparatus which acquires it and operates the same choice on a corresponding Inverse SDCT selected from a corresponding set of pre-built ISDCTs. Such indicator may be associated to a specific coding mode that implies the use of a specific SDCT.

The above-mentioned set of Steerable Discrete Cosine Transforms can be constructed in a plurality of modes. In a first example, having a 16-angle quantization, the encoder and decoder could have in memory 16 SDCTs in which each pair of eigenbasis has been rotated by the same angle θ. In a second example, each SDCT in the transform group may have each pair of vectors rotated according to a different rotation angle.

In another embodiment, the angle θ of the current block can be predicted from the angle θ of one or more previously coded blocks of the current image or of a previously coded one. In this case, it is possible to transmit only a "skip" flag (if they are identical) or the predicted difference to the decoder. At the decoder side, when receiving the "skip" flag or the prediction difference, the angle θ will be derived accordingly.

In another embodiment of the present invention, the transforms DCT and SDCT can be applied in a hybrid manner in order to maximize the coding performances according to the specific semantic of each block or image block. In this scenario, for example, when the rotation angle θ or the associated coding mode is not transmitted, the system may use the simple 2D-DCT or any other transform; on the contrary, when the decoder receives the angle θ or a coding mode that implies the angle θ, the decoding apparatus knows that a Steerable Cosine Transform has been applied and reconstructs the transformed coefficients accordingly. More in details, the SDCT and/or the associated angle/angles can be specified in syntax information of the coded bit stream, for example the PPS (Picture Parameter Set) or the slice header or any other syntax representation known at the encoder and decoder side.

In another embodiment of the present invention, a sub-band coding could be applied prior to applying the SDCT. Sub-band coding decomposes the source output into components on the basis of the frequency. Being the transformation matrix symmetric with respect to the diagonal, it is possible to consider only a subpart of the coefficients, ordered in an arbitrary way, an example of the considered coefficient and an example of a proposed ordering are shown in FIGS. 12-*a* and 12-*b*.

Figure 12:
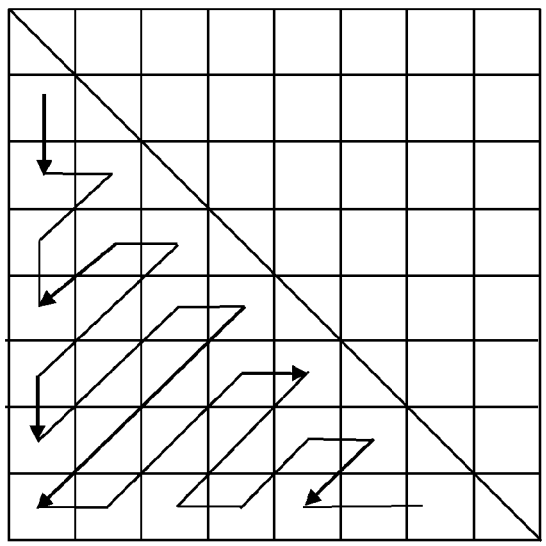
FIG. 12 shows an example of one possible approach for reading and subdivide a SDCT in sub-bands. The steps concern (a-b) reading half of the block following a zig-zag ordering (c) dividing the ordered coefficients in a number of sub-bands, four in the example in figure.
Figure 19:
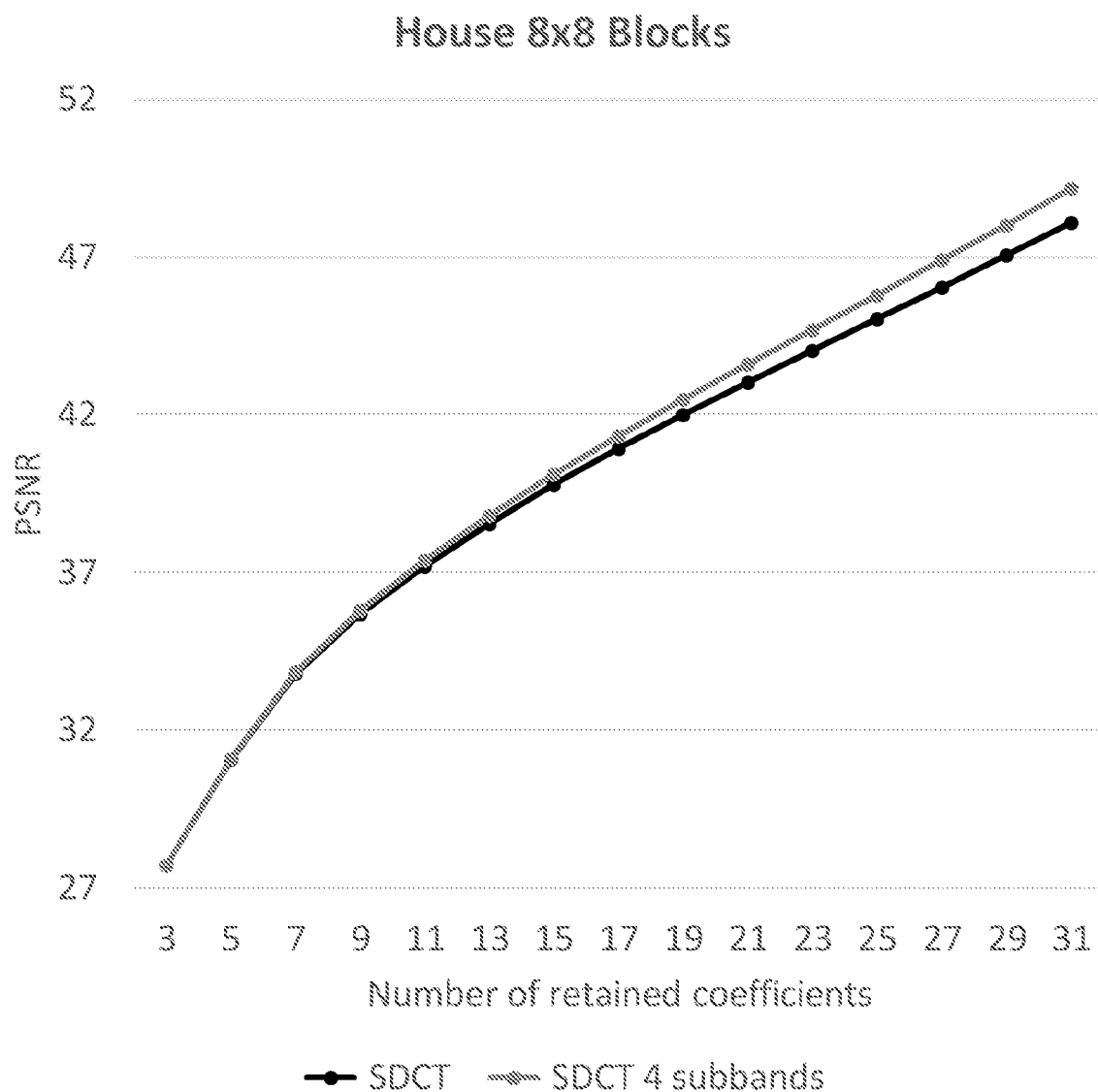
FIG. 19 shows comparison test, as function of the retained coefficients and PSNR, between SDCT and SDCT with 4 sub-bands.

In the present embodiment, SDCT considered coefficients could be subdivided in a variable number of sub-bands, FIG. 12-*c* shows an exemplary division in four sub-bands of equal size. Each sub-band is then assigned a different rotation angle θ that better represents the considered samples block. Some results are plotted in FIG. 19: by increasing the values of retained coefficients, the 4-subbands SDCT outperforms the SDCT.

In another embodiment of the present invention, another method and the associated system of coding and decoding digital video streams by means of the Steerable Discrete Cosine Transform SDCT is exploited.

Figure 16:
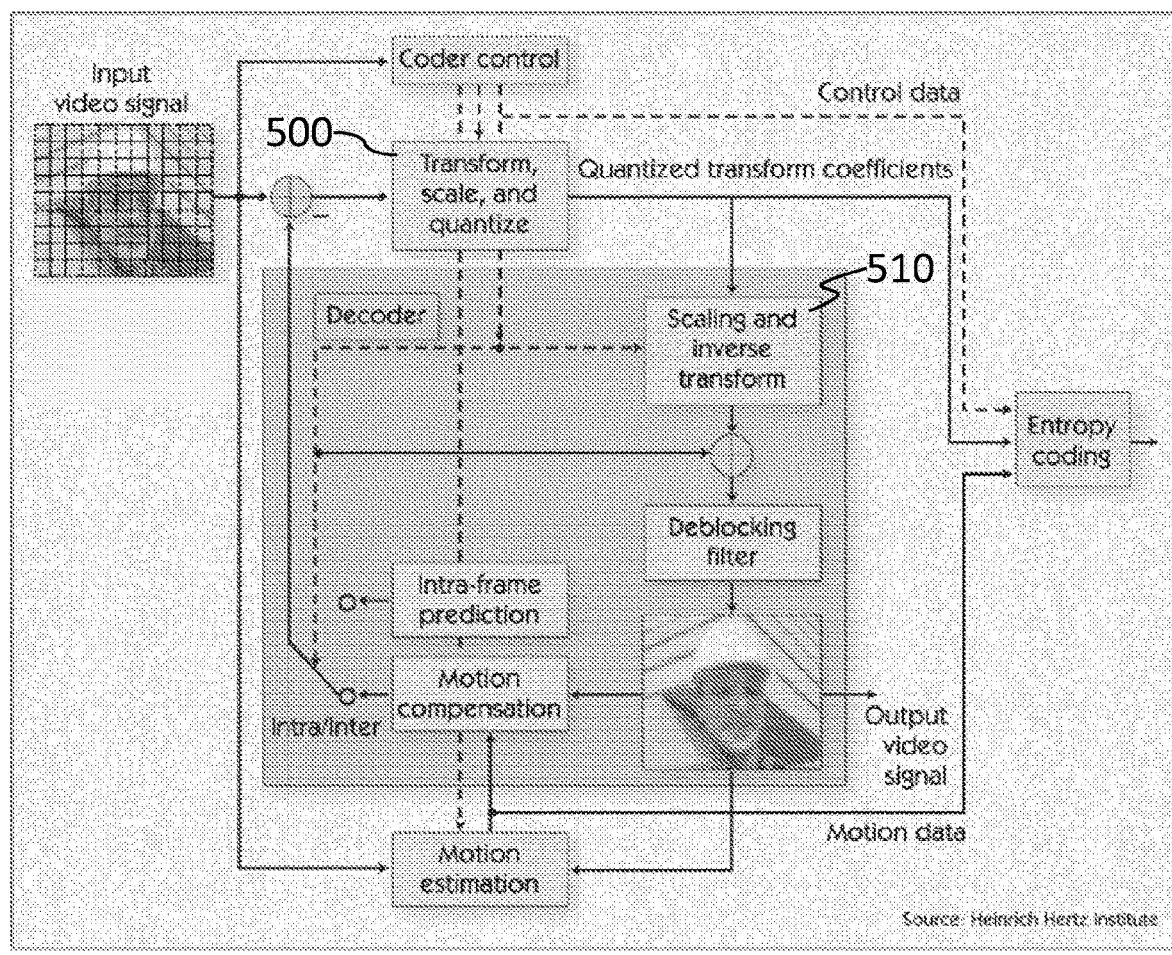
FIG. 16 depicts a typical block scheme for video compression exploiting the use of the SDCT.

A typical block scheme for video compression exploiting the use of the new SDCT is exemplary described in FIG. 16. In the following only the main parts of the video encoding system in FIG. 16, essential to understand the use of the Steerable Cosine Transform in this framework, will be described.

For each image block, the encoding system performs either an intra-frame prediction or motion estimation and compensation to predict the current image samples.

In a generic framework, the intra frame prediction unit (Transform, Scale and Quantize unit 500 in FIG. 16), additionally with respect to grayscale image coding, performs some processing for the chroma components (e.g., scaling filtering).

In a conventional hybrid video coding and decoding system, like MPEG2 MPEG4/AVC or HEVC, the transform operation performed by unit 500 is a plain 2D-DCT transform. The same applies to the inverse transform operation performed by the Scaling and Inverse transform unit 510, by which a plain Inverse 2D-DCT transform is carried out in order to reconstruct the image samples, compute the rate distortion cost and decide how to perform the hybrid encoding process.

Instead, according to an embodiment of the invention the unit 500 contains an image-like coding on the intra frames as depicted in FIG. 8, apart from the entropy coding stage 1103, which is absent; sometimes, depending on the image semantics, the prediction unit can predict the current block from the spatially neighboring blocks.

The inter-frame prediction unit exploits the motion estimation unit to find the most similar block in a set of previously encoded frames and, through the so-called "motion-compensation", exploit the selected block to predict the current one.

A difference between the predicted pixel values and the original ones is computed for predictive intra coding and inter-frame coding. This difference is often referred to as "residual image" or "residual error" or "residual value". According to an embodiment of the invention this residual image is then transformed according to the coding method described in FIG. 9, generating SDCT transformed coefficients (as previously described). These coefficients are quantized and entropy coded before being sent to the channel or memorization unit. Thus, in one embodiment of the present invention, the SDCT is applied to the residual image blocks.

In another embodiment of the present invention, the angle θ is the selected direction of the intra frame coding mode; in this case it may not be necessary the transmission of the angle information or the associated coding modes, since the decoding apparatus already receives the intra mode prediction information (e.g., the index) and can easily derive the prediction direction information.

Figure 17:
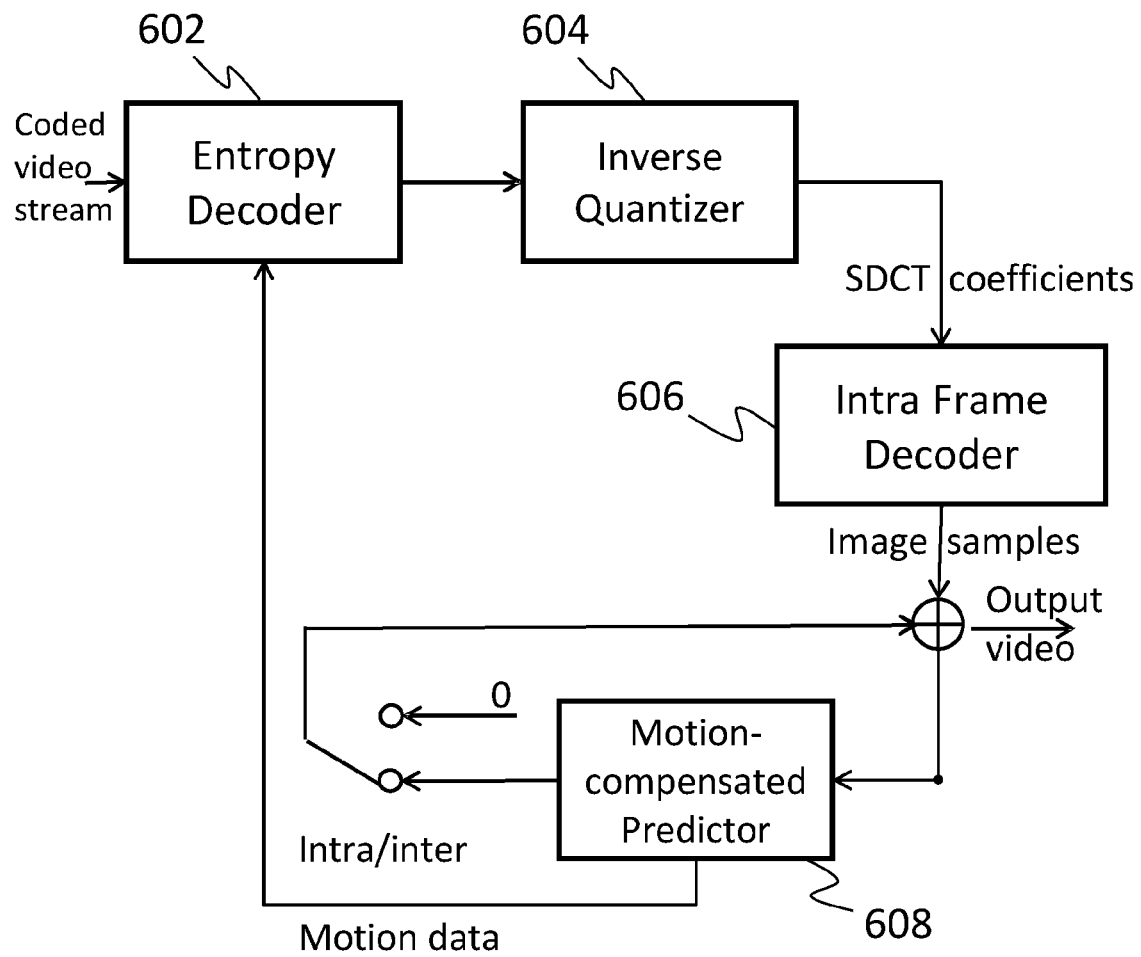
FIG. 17 shows a typical block scheme for video decoding exploiting the use of the ISDCT.

Similarly, FIG. 17 shows an exemplary video decoding apparatus exploiting the use of Steerable Discrete Cosine Transform. The hybrid-encoded samples of a video stream are entropy decoded and de-quantized by, respectively, the entropy decoder 602 and the inverse quantizer 604, recovering the SDCT transformed coefficients.

SDCT transformed coefficients feed the Intra Frame Decoder 606 which contains the Inverse SDCT (or ISDCT) transform unit operating according to the decoding steps presented in FIG. 11.

The output of this decoding phase could be either a residual block or an intra block. In the first case, i.e., if the decoded samples pertain to a residual block, generally it means that the current block has been predicted from a neighbor block inside the same frame (intra-frame prediction) or from a block contained in a previously decoded frame in the reference buffer (inter-frame prediction). In the first case (i.e., intra frame prediction) these residual values are summed to the reference block values inside the current picture; in the second case, i.e., inter frame prediction, the Motion-compensated Predictor 608 recovers the motion information (e.g., motion vectors and index of a reference block in one or more previously decoded images/frame) and the residual values are summed to the corresponding block values of one or more previously decoded frames.

At this point, after some additional operations possibly performed by the video decoding apparatus, the image can be sent to the display device.

These operations, like de-scaling, de-blocking and so on are not depicted and described here since they are negligible with regard to the present invention.

In another embodiment of the invention, the image or image block is first analysed with regard to the presence and orientation of discontinuities like borders and/or color changes; depending on the result of the such analysis a decision about the use of a plain 2D-DCT or an SDCT transform is taken; possibly also the optimal angle is selected basing on the orientation of the discontinuities.

The analysis can be done before starting the hybrid video coding by individuating for the whole image the kind of domain transform to be applied on each block and possibly also the block sizes of the transforms, if an adaptive block size is carried out. In an alternative embodiment of the invention, the analysis is done during the hybrid encoding block by block, and/or image by image in case of video data.

In another embodiment also the dimensions of the SDCT transform can be determined basing on the analysis of the image semantics: for example if two discontinuities having different orientations would be comprised in the same SDCT transform block, i.e., of 16×16, the dimension of the block transform can be reduced to 8×8 or 4×4 until only one of the two discontinuities are present or at least prevailing in distinct transform blocks.

Hybrid video coding is the context in which the invention has been described; anyway it applies to the compression and decompression of any bidimensional signal in which a domain transform is useful for solving the technical problem faced by the invention, i.e., to increase the coding efficiency by adapting the coefficients obtained by the domain transform to the orientations of the discontinuities present in the bidimensional signal by employing a directional transform.

In another embodiment, the objective function J in FIG. 10 could follow a different approach to measure the coding efficiency, for example, a rate-distortion optimization metric, which calculates the minimum transmission bitrate R for a given distortion D, can be applied, e.g., minimizing a Lagrangian cost function $J=D+\lambda R$ where $\lambda$ here is the so-called Lagrange multiplier.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. An apparatus for encoding digital images, comprising:
    an input unit configured for acquiring at least a portion of at least an image (f) from a source (S),
    an output unit configured for outputting at least a portion of an encoded image to a destination,
    at least one processor configured for:
    a) reading at least the portion of said image (f),
    b) determining a Laplacian of a square grid graph associated to a Discrete Cosine Transform (DCT) matrix able to transform said at least the portion of the image (f) from a spatial domain to a frequency domain,
    c) determining eigenvalues of the Laplacian with multiplicity greater than one,
    d) selecting for at least one of the eigenvalues determined as step c) a set of basis vectors of the DCT matrix that are eigenvectors of the Laplacian corresponding to the at least one eigenvalue,
    e) rotating the set of basis vectors by a rotation angle (θ),
    f) determining a rotated transform matrix (V') which has as basis vector the rotated set of basis vectors,
    g) computing transformed coefficients f^) by transforming pixel values contained in the at lesat the portion of the image (f) from the spatial domain to the frequency domain by means of the rotated transform matrix (V'), and
    h) outputting, by means of an output unit, the transformed coefficients (f^) to the destination.

2. The encoding apparatus according to claim 1, wherein at least two sets of basis vectors corresponding to different eigenvalues are rotated by the same rotation angle (θ).

3. The encoding apparatus according to claim 1, wherein at least two sets of basis vectors corresponding to different eigenvalues are rotated by different angles.

4. The encoding apparatus according to claim 1, wherein the at least one processor is configured for determining the rotation angle (θ) by selecting a rotation angle that minimizes or maximizes an objective function estimating a coding efficiency associated with the at least the portion of the image (f).

5. The encoding apparatus according to claim 4, wherein the objective function determines a rate-distortion optimization metric based on a reconstructed image (f') computed on a basis of the transformed coefficients (f^).

6. The encoding apparatus according to claim 4, wherein the objective function determines a psycho-visual optimization metric based on a reconstructed image (f') computed on a basis of the transformed coefficients (f^).

7. The encoding apparatus according to claim 1, wherein the at least one processor is configured for performing intra frame coding by generating intra frame prediction information, and determining the rotation angle (θ) on a basis of the intra frame prediction information.

8. The encoding apparatus according to claim 1, further comprising a memory unit containing at least a set of rotated transform matrices (V'), wherein each rotated transform matrix (V') is associated with a respective rotation angle used for computing the rotated transform matrix (V') starting from the respective Discrete Cosine Transform matrix (V), wherein the at least one processor is also configured for selecting the rotated transform matrix (V') contained in the memory unit on a basis of the determined rotation angle (θ).

9. The encoding apparatus according to claim 1, wherein the at least one processor is configured for determining the rotation angle (θ) also on a basis of a previously coded portion of the at least a portion of the image (f) or a second image.

10. The encoding apparatus according to claim 1, wherein the at least one processor is also configured for determining a number of discontinuities present in the at least a portion of the image (f), and for reducing a size of the at least the portion of the image (f) if the number of discontinuities is greater than one.

11. The encoding apparatus according to claim 1, wherein the at least one processor is configured for encoding at least one frame by computing at least a residual image, and wherein the at least the portion of the image (f) is a portion of the at least the residual image.

12. An apparatus for decoding digital images, comprising:
an input unit configured for acquiring at least an encoded portion of an image (f) from a communication channel or a storage media (C),
an output unit configured for outputting a reconstructed image (f'),
at least one processor configured for:
a) receiving, through the input unit, transformed coefficients (f^) of the at least the encoded portion of the image (f),
b) determining a Laplacian of a square grid graph associated to a Discrete Cosine Transform (DCT) matrix able to inverse transform the at least the encoded portion of the image (f) from a frequency domain to a spatial domain,
c) determining eigenvalues of the Laplacian with multiplicity greater than one,
d) selecting for at least one of the eigenvalues determined at step c) a set of basis vectors of the DCT matrix that are the eigenvectors of the Laplacian corresponding to the at least one of the eigenvalues,
e) rotating the selected set of basis vectors by a rotation angle ($\theta$),
f) determining a rotated transform matrix (V') which has as basis vectors the rotated selected set of basis vectors,
g) computing the reconstructed image (f') by inverse transforming the transformed coefficients (f^) from the frequency domain into the spatial domain by means of the rotated transform matrix (V'),
h) outputting, through the output unit, the reconstructed image (f').

13. The decoding apparatus according to claim 12, wherein at least two sets of basis vectors corresponding to different eigenvalues are rotated by the same rotation angle ($\theta$).

14. The decoding apparatus according to claim 12, wherein at least two sets of basis vectors corresponding to different eigenvalues are rotated by different angles.

15. The decoding apparatus according to claim 12, wherein the at least one processor is configured to inverse transform the transformed coefficients (f^) by transposing the rotated transform matrix (V').

16. The decoding apparatus according to claim 12, wherein the at least one processor is configured for performing intra frame decoding on a basis of intra frame prediction information received through the input unit, and determining the rotation angle ($\theta$) on a basis of the intra frame prediction information.

17. The decoding apparatus according to claim 12, further comprising a memory unit containing at least a set of rotated transform matrices (V'), wherein each rotated transform matrix (V') is associated to a respective rotation angle used for computing the rotated transform matrix (V') starting from the respective Discrete Cosine Transform matrix (V), wherein the at least one processor is also configured for selecting the rotated transform matrix (V') contained in the memory unit on a basis of the determined rotation angle ($\theta$).

18. The decoding apparatus according to claim 12, wherein the at least one processor is configured for determining the rotation angle ($\theta$) also on a basis of a previously decoded portion of the image (f) or a second image.

19. The decoding apparatus according to claim 12, wherein the at least one processor is configured for decoding at least one frame portion on a basis of at least a residual image block received through the input unit.

20. A method for encoding digital images or video streams, comprising:
a receiving phase, wherein at least a portion of an image (f) is received by means of an input unit,
a determining phase comprising:
determining a Laplacian of a square grid graph associated to a Discrete Cosine Transform (DCT) matrix able to transform the at least the portion of the image (f) from a spatial domain to a frequency domain,
determining the eigenvalues of the Laplacian with multiplicity greater than one,
a selection phase comprising selecting for at least one of the eigenvalues a set of basis vectors of the DCT matrix that are the eigenvectors of the Laplacian corresponding to the at least one of the eigenvalues,
a rotational phase, wherein at least one rotation angle ($\theta$) is determined, by means of a processing unit, for rotating the selected set of basis vectors, and wherein a rotated transform matrix (V') is determined as a result of rotating the selected set of basis vectors by the at least one rotation angle ($\theta$),
a transform phase, wherein transformed coefficients (f^) are computed on a basis of pixels contained in the at lesat an encoded portion of the image (f) and the rotated transform matrix (V') by transforming pixel values contained in the at least an encoded portion of the image (f) from the spatial domain into the frequency domain by means of the rotated transform matrix (V'), and
an output phase, wherein the transformed coefficients (f^) are transmitted to a destination by means of an output unit.

21. A method for decoding digital images or video streams, comprising:
a receiving phase, wherein transformed coefficients (f^) of an encoded portion of an image (f) are received through an input unit,
a determination phase comprising:
determining a Laplacian of a square grid graph associated to a Discrete Cosine Transform (DCT) matrix able to inverse transform the encoded portion of the image (f) from a frequency domain to a spatial domain,
determining the eigenvalues of the Laplacian with multiplicity greater the one,
a selection phase comprising selectingfor at least one of the eigenvalues determined in the determination phase a set of basis vectors of the DCT matrix, that are the eigenvectors of the Laplacian corresponding to the at least one eigenvalue,
a rotational phase, wherein a rotated transform matrix (V') is determined by means of a processing unit, wherein the rotated transform matrix (V') is determined as a result of rotating the selected set of basis vectors by the at least one rotation angle ($\theta$),
an inverse transform phase, wherein a reconstructed image (f') is computed on a basis of the transformed coefficients (f^) and the rotated transform matrix (V') by inverse transforming the transformed coefficients (f^) from the frequency domain into the spatial domain by means of the rotated transform matrix (V'), and
an output phase, wherein the reconstructed image (f') is outputted through an output unit.

\* \* \* \* \*